US008006717B2

(12) United States Patent
Ando et al.

(10) Patent No.: US 8,006,717 B2
(45) Date of Patent: Aug. 30, 2011

(54) INJECTION VALVE OF HIGH PRESSURE HOMOGENIZER AND INJECTION VALVE UNIT OF THE SAME

(76) Inventors: Shigeo Ando, Chohshi (JP); Masao Ando, Chohshi (JP); Toyoroku Ando, Chohshi (JP)

( * ) Notice: Subject to any disclaimer, the term of this patent is extended or adjusted under 35 U.S.C. 154(b) by 545 days.

(21) Appl. No.: 12/038,372

(22) Filed: Feb. 27, 2008

(65) Prior Publication Data

US 2008/0202601 A1 Aug. 28, 2008

(30) Foreign Application Priority Data

Feb. 28, 2007 (JP) ................................ 2007-049292
Oct. 2, 2007 (JP) ................................ 2007-258749

(51) Int. Cl.
*F16K 31/06* (2006.01)

(52) U.S. Cl. ..................... 137/596.17; 251/56; 251/123; 251/215; 251/367

(58) Field of Classification Search ............. 137/596.17; 251/56, 123, 215, 367; 366/151.1, 176.1, 366/176.2, 181.4, 184.5
See application file for complete search history.

(56) References Cited

U.S. PATENT DOCUMENTS 2,817,500 A * 12/1957 Robinson ........................ 241/33
3,276,751 A * 10/1966 Svensson et al. .......... 366/180.1
3,623,703 A * 11/1971 Nielander ....................... 366/96
3,658,266 A * 4/1972 O'Keefe et al. ............ 241/101.2
3,738,618 A * 6/1973 Hehl ................................ 366/79
3,937,447 A * 2/1976 Alwes et al. .................... 366/79
3,980,280 A * 9/1976 Benson ....................... 366/150.1
2004/0223406 A1* 11/2004 Burak ........................... 366/273

FOREIGN PATENT DOCUMENTS

EP 0850683 A2 7/1998
JP 60-19921 B1 5/1985

OTHER PUBLICATIONS

Taiwanese Office Action dated May 5, 2011 (9 pages).

* cited by examiner

*Primary Examiner* — John Rivell
*Assistant Examiner* — Craig Price
(74) *Attorney, Agent, or Firm* — Reising Ethington P.C.

(57) ABSTRACT

A high pressure homogenizer segmentalizes material made of minute solid or the like by passing suspension liquid including the material to a small diameter orifice at high speed under high pressure. An injection valve of the high pressure homogenizer includes: a fixed member having a material introducing passage therein; and a movable member disposed rotatably, swingably, or pulsatingly opposite to the fixed member in an axial direction of the fixed member. The orifice of the injection valve is made of a fine gap in a radial direction disposed between an end face of the fixed member facing an end of the material introducing passage and an end face of the movable member disposed at an end of the movable member opposed to the fixed member. The orifice communicates with a material processing passage via a ring-shaped collision wall.

32 Claims, 20 Drawing Sheets

INJECTION VALVE OF HIGH PRESSURE HOMOGENIZER AND INJECTION VALVE UNIT OF THE SAME

CROSS REFERENCE TO RELATED APPLICATIONS

This application claims priority to Japanese Patent Application No. 2007-049292 filed Feb. 28, 2007 and Japanese Patent Application No. 2007-258749 filed Oct. 2, 2007, the contents of both of which are hereby incorporated by reference.

BACKGROUND OF THE INVENTION

1. Field of the Invention

The present invention relates to an injection valve and an injection valve unit of a high pressure homogenizer. Such a homogenizer is used for segmentalizing material of food, chemical goods, medical goods, various synthetic resins and the like.

2. Description of the Related Art

Conventionally, for example, there is a conventional high pressure homogenizer to segmentalize material in a suspension including fibrous cellulose by passing the suspension through a small diameter orifice at high speed under high pressure in a paper manufacturing industry or the like (for example, Japanese Patent Application Publication No. S60-19921).

However, a method using the conventional high pressure homogenizer described in Japanese Patent Application Publication No. S60-19921 is to segmentalize material with a large pressure drop by passing the suspension of the fibrous cellulose as material through a small diameter orifice formed between a valve seat and a valve element under high pressure. The valve is pressed onto the valve seat by a driving force of the cylinder having a piston, or by a pressing force of a spring for regulating an inner pressure. Therefore, it is difficult to keep a fine gap of the orifice, and a process accuracy of segmentalizing the material is not good. Further, if the orifice gap is too narrow, the material in the suspension is easily lodged in the orifice to affect the segmentalizing process. On the other hand, if the orifice gap is too wide, the segmentation accuracy is spoiled.

Further, when the suspension is viscous, the orifice having a fine gap is easily plugged so that the segmentation of the material is not carried out. Further, when the orifice is plugged, it is necessary to disassemble the high pressure homogenizer, and clean an interior of the homogenizer, and assemble again the homogenizer. Therefore, maintenance of the homogenizer is not easy.

Further, in the homogenizer using the driving force of the cylinder to press the valve onto the valve seat, it is hard to control bit by bit the cylinder to form the fine orifice gap, and such a homogenizer is not suitable for continuous running. On the other hand, in the homogenizer using the pressing force of the spring, it is hard to select a spring having a suitable pressing force, and the valve may not be fully open or closed. Therefore, the material to be processed may be leaked, or generating the high pressure may be difficult. Thus, an efficiency of the segmentation process is reduced.

Further, parts constituting the valve are easily damaged, and their mechanical lifetimes are short. Thus, the maintenance of the homogenizer is not easy and expensive.

Accordingly, an object of the present invention is to provide an injection valve and an injection valve unit of a high pressure homogenizer to allow to keep a fine gap of an orifice easily, and to prevent material from leaking. Further, even when a suspension is viscous, an orifice thereof is not plugged so that segmentation is efficiently and precisely carried out. Further, a structure thereof is simple to reduce abrasion and damage of parts, thus a mechanical lifetime is long, and it is easy to exchange parts thereof.

SUMMARY OF THE INVENTION

In order to attain the object, according to the present invention, there is provided an injection valve of a high pressure homogenizer comprising:

a fixed member having a material introducing passage therein; and a movable member disposed rotatably, swingably, or pulsatingly opposite to the fixed member in an axial direction of the fixed member, wherein an orifice of the injection valve is made of a fine gap disposed between an end face of the fixed member facing an end of the material introducing passage and an end face of the movable member disposed at an end of the movable member opposed to the fixed member, and wherein the orifice communicates with a material processing passage disposed at a secondary side via a collision wall formed on an outer periphery of the orifice.

Preferably, the injection valve further including:

a pressure sensor for detecting that a compression pressure of a booster mechanical section is a predetermined pressure; and a motor as a driving source to rotate the movable member normally or reversely, swing, or pulsate the movable member according to a detection signal detected by the pressure sensor.

Preferably, the fixed member and the movable member are received in a cylinder case in which a material introducing port communicating with the material introducing passage is disposed at one side thereof, and a material exhausting port communicating with the orifice is disposed at the other side thereof.

Preferably, the fixed member is a valve seat received in the cylinder case.

Preferably, the movable member is a shaft valve supported rotatably, swingably, or pulsatingly in the cylinder case via a roller bearing member, and disposed rotatably, swingably, or pulsatingly via a rotation transmitting member arranged at the other end thereof owing to driving force of the motor.

Preferably, a tip of the movable member is inserted loosely into a small diameter receiving hole of the fixed member.

Preferably, an outer peripheral wall with a small slope angle with respect to an axial line is formed on a tip part of the movable member, and the tip part is loosely inserted into the small diameter receiving hole of which inner peripheral wall is sloped.

Preferably, the slope angle of the outer peripheral wall is from one to twenty degrees with respect to the axial line.

Preferably, the gap width of the orifice is adjusted by moving forward or backward slightly the movable member with respect to the fixed member owing to pressing force of a cylinder disposed on an extension from the other end of the shaft valve in an axial direction of the shaft valve.

Preferably, the tip is a tip member made of cemented carbide, and detachably attached to the movable member by screwing a tip of a mounting bolt into the movable member in a direction of an internal axis of the movable member.

Preferably, the material introducing port communicating with the material introducing passage is disposed at one side of the cylinder case, the material exhausting port is disposed at a rear of the orifice, a direction switching passage for adjusting the gap of the orifice by moving forward or backward the movable member with respect to the valve seat is formed in an interior of the cylinder case, the cylinder case is divided into several cylinder case blocks in the axial direction, and the cylinder case blocks are connected to each other in the axial direction via connecting members.

Preferably, the cylinder case is configured by at least connecting in the axial direction:

a cylinder case block having an area for setting an inner pressure adjusting valve in which the orifice is formed;

another cylinder case block having an area for introducing motivity where the driving force of the motor is introduced via rotation transmitting parts; and another cylinder blocks having the direction switching passage in which a forward pressure introducing passage for moving the movable member toward the valve seat as the fixed member by applying pressure, and/or a backward pressure introducing passage for moving the movable member away from the valve seat by applying pressure are formed.

Preferably, a plurality of guiding rods projecting from one side or both sides of one of the cylinder case blocks movably penetrates the other cylinder case blocks via bearings in the axial direction. After releasing the connections with the connecting members, the other cylinder case blocks are guided by the guiding rods to be separated from each other.

Preferably, at a normal time when the material is dispersed, emulsified, atomized, or cells of the material are disrupted, several cylinder case blocks are connected with the connecting members and disposed immovably at a setting position in a substantially center of supporting rods in a width direction thereof while the cylinder case blocks are supported movably by the guiding rods, said supporting rods arranged right and left of an attaching base. Further, either of the cylinder case blocks or the connecting members is elevatably supported against the others by an elevating cylinder. Further, at a time when parts are exchanged, or an interior of the injection valve is cleaned, either of the cylinder case blocks or the connecting members are elevatably raised to a movement permissible height of the cylinder case blocks against the others.

Preferably, the connecting members are attached to a bridged link linked to upper or lower part of the cylinder case blocks in the width direction thereof via the supporting rods separated from the cylinder case blocks. Further, one side in the width direction of the bridged link is pivotably mounted on the attaching base via a spindle, and the other side in the width direction of the bridged link is coupled to a cylinder rod of the elevating cylinder. Further, at the time when parts are exchanged, or an interior of the injection valve is cleaned, the connecting members are inclinably mounted about the spindle at a movement permissible height to allow the cylinder case blocks positioned at the setting position to move horizontally from the setting position owing to driving of the elevating cylinder.

Preferably, the connecting members are a plurality of bolts to be screwed into and separably integrated with the cylinder case blocks.

Preferably, the connecting members are clipping cylinders to couple the cylinder case blocks moved down from a movement permissible position to the setting position onto the attaching base, or to clip the cylinder case block at a dropping position where the connecting members are dropped from the movement permissible position to the setting position against the fixed cylinder case blocks.

Preferably, the movable member has a first spill part formed on an outer periphery in a substantially center of the movable member to receive pressure from the forward pressure introducing passage formed on the cylinder case, and a second spill part formed on the outer periphery at a back side of the movable member to receive both pressure from the forward pressure introducing passage and pressure from the backward pressure introducing passage.

Preferably, the rotation transmitting parts are gears including a driving gear mounted on a motor shaft, or composed of a driving pulley mounted on the motor shaft, and a passive pulley formed on an outer periphery of the movable member, and a power transmitting belt wounded around the driving pulley and the passive pulley.

Preferably, the orifice has a gap less than 0.01 mm.

Preferably, an inner pressure of the orifice is adjusted to high pressure.

Preferably, the motor is rotated in a range of 10 rotations/min to 100 rotations/min in order to torque the shaft valve as the movable member.

Preferably, the roller bearing member is consist of any one of a ball bearing, a thrust bearing, a roller bearing, a gunmetal bearing having a porous part including oil on its surface, or a combination of the same.

According to another aspect of the present invention, there is provided an injection valve unit of a high pressure homogenizer comprising:

a fixed member having a material introducing passage in a cylinder case; and a movable member disposed normally and reversely rotatably, swingably, or pulsatingly opposite to the fixed member in an axial direction of the fixed member, wherein an orifice of the injection valve is made of a fine gap disposed between an end face of the fixed member facing an end of the material introducing passage and an end face of the movable member disposed at an end of the movable member opposed to the fixed member, and wherein the orifice communicates with a material processing passage disposed at a secondary side via a collision wall formed at an outer periphery.

Preferably, the injection valve unit further including:

a tip member made of cemented carbide, and detachably attached to the movable member by screwing a tip of a mounting bolt into the tip member, said mounting bolt is inserted into the movable member in a direction of an internal axis of the movable member.

Preferably, the movable member is a shaft valve supported in the cylinder case via a roller bearing member, and disposed normally and reversely rotatably, swingably, or pulsatingly via a rotation transmitting member arranged at the other end thereof owing to driving force of the motor.

Preferably, an outer peripheral wall with a small slope angle with respect to an axial line is formed on a tip part or the tip member of the movable member, and the tip part or the tip member is loosely inserted into the small diameter receiving hole of the fixed member, of which inner peripheral wall is sloped.

Preferably, the slope angle of the outer peripheral wall is from one to twenty degrees with respect to the axial line.

Preferably, the cylinder case is divided into several cylinder case blocks in the axial direction, and the cylinder case blocks are connected to each other in the axial direction via connecting members. Further, a plurality of guiding rods projecting from one side or both sides of one of the cylinder case blocks movably penetrates the other cylinder case blocks via bearings in the axial direction. After releasing the connections with the connecting members, the other cylinder case blocks are guided by the guiding rods to be separated from each other.

Preferably, the connecting members are a plurality of bolts to be screwed into and separably integrated with the cylinder case blocks.

Preferably, the connecting members are clipping cylinders to couple the cylinder case blocks at a dropping position where the several cylinder case blocks are moved downward to the base.

These and other objects, features, and advantages of the present invention will become more apparent upon reading of the following detailed description along with the accompanied drawings.

DETAILED DESCRIPTION OF THE PREFERRED EMBODIMENTS

Figure 1:
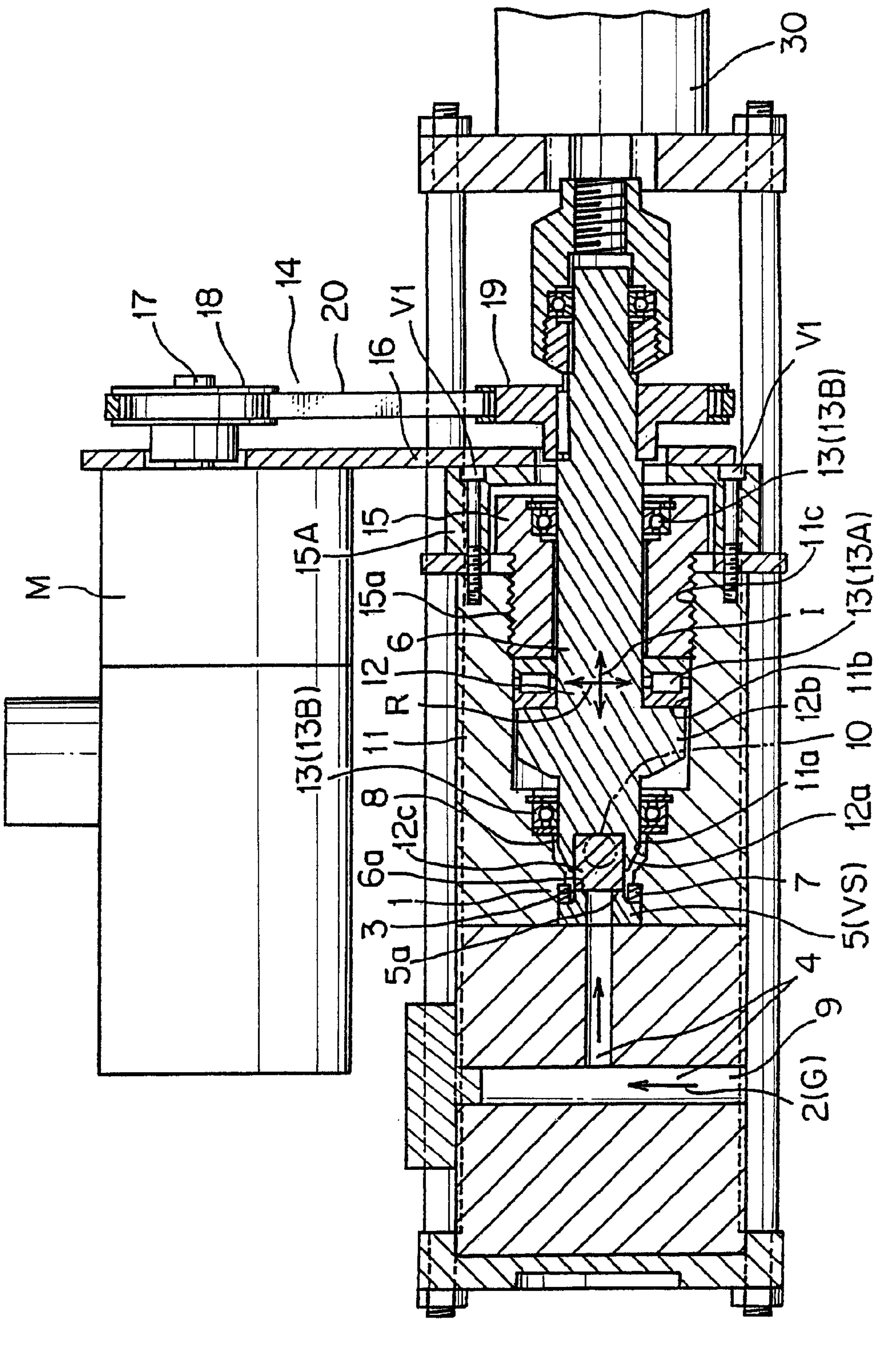
FIG. 1 is a sectional view showing a first embodiment of an injection valve of a high pressure homogenizer according to the present invention.
Figure 2:
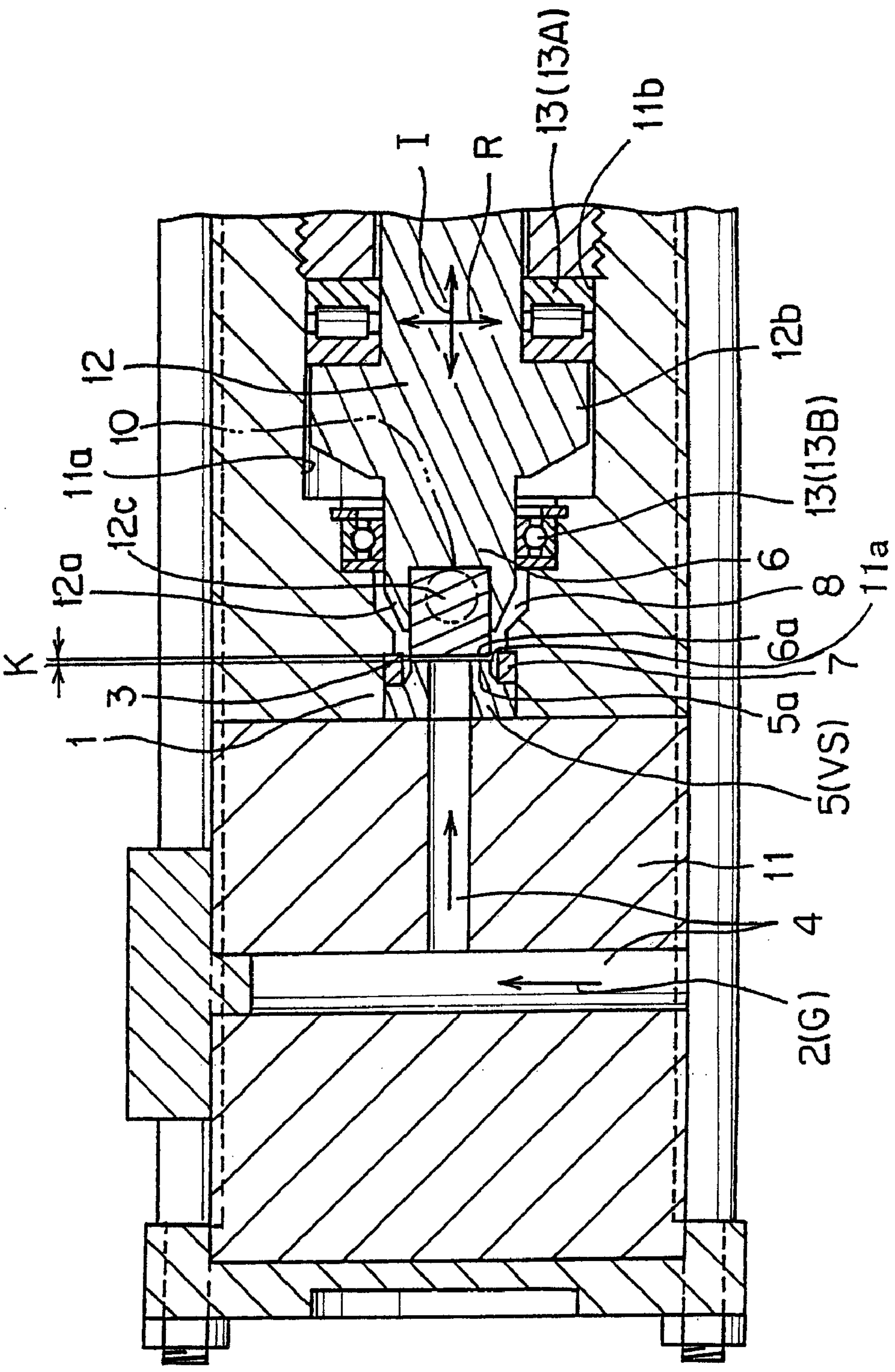
FIG. 2 is a partially enlarged sectional view showing the same.

Embodiments of an injection valve of a high pressure homogenizer according to the present invention will be explained with reference to figures.

The high pressure homogenizer disperses, emulsifies, or segmentalizes material G, or breaks down membranes thereof, by passing suspension liquid 2 to a small diameter orifice 3 formed on a high pressure homogenization mechanical section 1 at high speed under high pressure. Here, the suspension liquid 2 includes the material G made of minute solid, fibrous cellulose, cells or the like.

First Embodiment

According to a first embodiment of the present invention, the injection valve of the high pressure homogenizer includes:

a fixed member 5 having a material introducing passage 4 therein; and a movable member 6 disposed rotatably, swingably, or pulsatingly opposite to the fixed member 5 in an axial direction I of the movable member 6, wherein the orifice 3 of the injection valve is made of a fine gap K disposed between an end face 5*a* of the fixed member 5 facing an end of the material introducing passage 4 and an end face 6*a* of the movable member 6 disposed at an end of the movable member 6 opposed to the fixed member 5, and wherein the orifice 3 communicates with a material processing passage 8 disposed at a secondary side via a collision wall 7 formed on an outer periphery of the orifice 3.

As the fixed member 5, a valve seat VS is used in the first embodiment.

As for the material G, in a food field including tomato sauce, oil, dairy product such as butter or yogurt, cold beverage, fruit juice drink, soup, and infant food, solids such as various mixing agent, fibrous cellulose, and casein included in the suspension liquid 2 as a half-finished product or a finished product are listed as examples. Further, in fields of chemical and beauty products or other industrial products, solids of various pigment, magnetic powder, mineral, carbon powder or the like included in the suspension liquid 2 or the emulsified liquid as a half-finished product or a finished product are listed as examples. Further, in a drug medicine field, solids of mineral, natural medicine or the like included in the suspension liquid 2 or the emulsified liquid as a half-finished product or a finished product are listed as examples. Further, in a glass industry field, minute solids of pigment, mineral or the like included in a liquid glass are listed as examples. Further, in a synthetic resin industry field, mineral material such as pigment, carbon, mineral, plasticizing agent, reinforced fiber, or ceramics included in liquid thermoplastic resin are listed as examples. Further, in a papermaking industry field, solid of fibrous cellulose included in the suspension liquid 2 in a manufacturing process is listed as an example. Further, in a pathology research laboratory, fungi such as *Escherichia coli* bacterium or yeast, or microorganism cells included in the suspension liquid 2 are listed as examples.

As shown in FIG. 1, in the first embodiment, the orifice 3 communicates with a material processing passage 8 disposed at a secondary side via the collision wall 7 formed on an outer periphery of the orifice 3. Further, the orifice has a gap K less than 0.01 mm. The reason why the minute gap K less than 0.01 mm of the orifice 3 is formed between the end face 5*a* of the fixed member 5 and the end face 6*a* of the movable member 6 is because unintentional leak of the material G is prevented and the material G is segmentalized with high precision.

Further, an inner pressure of the orifice 3 is adjusted to high pressure such as 70 to 350 MPa or more than 350 MPa. Thus, by discharging swiftly the material G from the orifice 3 under high pressure, the material G is segmentalized with high precision due to a large differential pressure.

Further, the fixed member 5 and the movable member 6 are received in a cylinder case 11 in which a material introducing port 9 communicating with the material introducing passage 4 is disposed at one side thereof, and a material exhausting port 10 communicating with the orifice 3 is disposed at the other side thereof. The suspension liquid 2 pumped under high pressure from a not-shown booster mechanical section connected to the injection valve of the high pressure homogenizer according to the first embodiment of the present invention is supplied to the material introducing port 9.

Further, the movable member 6 is a shaft valve 12 formed in a substantially cylinder. A circular truncated cone 12*a* is formed at a tip of the shaft valve 12. A large diameter part 12*b* is formed at the tip side of the shaft valve 12. This shaft valve 12 is supported rotatably, swingably, or pulsatingly in the cylinder case 11 via a roller bearing member 13, and disposed rotatably, swingably, or pulsatingly via a rotation transmitting member 14 arranged at the other end thereof owing to driving force of the motor M. A tip member 12*c* is fitted into a tip of the shaft valve 12. The end face 6*a* of the movable member 6 is formed in front of the tip member 12*c*. A small diameter receiving hole 1*a* is formed in the cylinder case 11 and communicates with the material processing passage 8 for receiving the circular truncated cone 12*a* movably and rotatably. A large diameter receiving hole 11*b* is formed in the cylinder case 11 and communicates with the small diameter receiving hole 11*a*. The large diameter part 12*b* of the shaft valve 12 is movably and rotatably received in the large diameter receiving hole 1*b*. Further, according to the first embodiment, a motor M drives the shaft valve 12 normally and reversely rotatably. However, the motor M may drive the shaft valve 12 swingably or pulsatingly. Further, a type of the motor M is not limited according to the present invention.

The tip member 12*c* is made of metal, cermet, or the like. When the suspension liquid 2 includes hard mineral, solid body, carbon, or the like, preferably, the tip member 12*c* is made of cemented carbide. The cemented carbide may be made of such as Wc-Co alloy, WC—TiC—Co alloy, WC—TiC—Ta(Nb)C—Co alloy or the like, which are made by sintering carbide particle of 2*a*, 3*a*, 4*a* groups metal of the periodic system, for example, Ti, Zr, Hf, V, Nb, Ta, Cr, Mo, W with bonding material of iron group metal such as Fe, Co, Ni. Further, the tip member 12*c* may be made by covering the cemented carbide with ceramics such as Ti(CN), $Al_2O_3$. Further, the tip member 12*c* may be made of TiC—Ni cemented carbide. Further, the collision wall 7 may be made of one of the above-described cemented carbides.

A stopper 15 is formed in a substantially ring shape having a flange. The shaft valve 12 is rotatably attached to an interior of the cylinder case 11 by screwing a male screw part 15*a* formed on an outer periphery of the stopper 15 at a top side thereof into a female screw part 11*c* formed on an inner periphery of the large diameter receiving hole 11*b* of the cylinder case 11 at a rear side thereof. A stopping plate 16 overlaps with the stopper 15 via a boss board 15A and is detachably attached to the stopper 15 with a plurality of bolts V1.

Further, according to the first embodiment, the motor M is rotated normally or reversely in a range of 10 to 100 rotations/min so that the rotation force is transmitted to the shaft valve 12 as the movable member. Thus, even when the suspension liquid 2 is viscous, the orifice 3 is not plugged with the material G, and the material G is effectively segmentalized with high precision.

The rotation transmitting member 14 is composed of a motor shaft 17 of the motor M as a driving shaft, a pulley 18 mounted on the motor shaft 17, a pulley 19 mounted on the other end of the shaft valve 12 as a receiving side, and a belt 20 wound around the pulleys 18, 19.

Further, according to the first embodiment, the roller bearing member 13 supporting rotatably, swingably, or pulsatingly the shaft valve 12 as the movable member 6 is composed of thrust bearings 13A supporting rotatably, swingably, or pulsatingly an outer periphery of the substantially center of the shaft valve 12, and ball bearings 13B supporting rotatably, swingably, or pulsatingly an outer periphery of the shaft valve 12 at the front and rear sides thereof. However, the shown roller bearing member 13 is only an example. The roller bearing member 13 may be a roller bearing, a gunmetal bearing having a porous part including oil on its surface, or a combination of those.

A cylinder 30 is disposed on an extension from the other end of the shaft valve 12 in the axial direction I of the shaft valve 12. This cylinder 30 is disposed to press the shaft valve 12 in the axial direction I. Thus, the gap K of the orifice 3 is adjusted by approaching or removing the end face 6*a* of the movable member 6 of the shaft valve 12 in the axial direction I relative to the end face 5*a* of the fixed member 5.

The first embodiment of the present invention is composed of the above described. The high pressure homogenizer disperses, emulsifies, or segmentalizes material G, or breaks down membranes thereof, by passing suspension liquid 2 including the material G made of minute solid, fibrous cellulose, cells or the like to the small diameter orifice 3 formed on a high pressure homogenization mechanical section 1 at high speed under high pressure. The injection valve of the high pressure homogenizer includes: the fixed member 5 having the material introducing passage 4 therein; and the movable member 6 disposed rotatably, swingably, or pulsatingly opposite to the fixed member 5 in the axial direction I of the movable member 6. The orifice 3 of the injection valve is made of a fine gap K, for example less than 0.01 mm in a radial direction R disposed between the end face 5*a* of the fixed member 5 facing the end of the material introducing passage 4 and the end face 6*a* of the movable member 6 disposed at the end of the movable member 6 opposed to the fixed member 5. Therefore, the material G discharged swiftly from the orifice 3 under high pressure is dispersed due to a large differential pressure, and segmentalized by colliding with the ring-shaped collision wall 7 formed on the outer periphery of the orifice 3.

Further, because the orifice 3 is made of a fine gap K, for example less than 0.01 mm disposed between the end face 5*a* of the fixed member 5 and the end face 6*a* of the movable member 6 disposed at the end of the movable member 6 opposed to the fixed member 5, unintentional leak of the material G is prevented and the material G is segmentalized or processed with high precision.

Further, because the orifice 3 is made of a fine gap K, for example less than 0.01 mm disposed between the end face 5*a* of the fixed member 5 and the end face 6*a* of the movable member 6 disposed at the end of the movable member 6 opposed to the fixed member 5, an inner pressure of the orifice 3 is adjusted to high pressure such as 70 to 350 MPa or more than 350 MPa. Thus, by discharging swiftly the material G from the orifice 3 under high pressure, the material G is segmentalized and processed with high precision due to a large differential pressure.

Further, because the shaft valve 12 is supported rotatably, swingably, or pulsatingly in the cylinder case 11, this shaft valve 12 is rotated normally and reversely in a range of 10 to 100 rotations/min via a rotation transmitting member 14 arranged at the other end thereof owing to driving force of the motor M. Thus, because the shaft valve 12 as the movable member 6 is rotated due to the driving force of the motor M, and stirs and fluidizes the suspension liquid 2, even when the suspension liquid 2 is viscous, the orifice 3 is not plugged with the material G, discharging pressure is kept high, and the material G is effectively segmentalized with high precision. Incidentally, in the first embodiment as shown in FIG. 1, the motor M rotates the shaft valve 12 normally or reversely. However, this is only an example and the present invention is not limited to this. The motor M may drive the shaft valve 12 swingably, or pulsatingly.

Further, if the injection valve is unitized as an injection valve unit by embedding the orifice 3 into the cylinder case 11 while keeping the gap K of the orifice 3, such a unit is useful for transporting and storing in a warehouse. Further, when the injection valve fails, or is degraded, it is easy to change the injection valve.

Further, the orifice 3 is made of the fine gap K, for example less than 0.01 mm, disposed between the end face 5*a* of the fixed member 5 facing the end of the material introducing passage 4 and the end face 6*a* of the movable member 6 disposed at the end of the movable member 6 opposed to the fixed member 5, so that the orifice 3 communicates with the material processing passage 8 disposed at the secondary side via the collision wall 7 formed on the outer periphery of the orifice 3. Therefore, the orifice 3 is formed with high precision.

Second Embodiment

Figure 3:
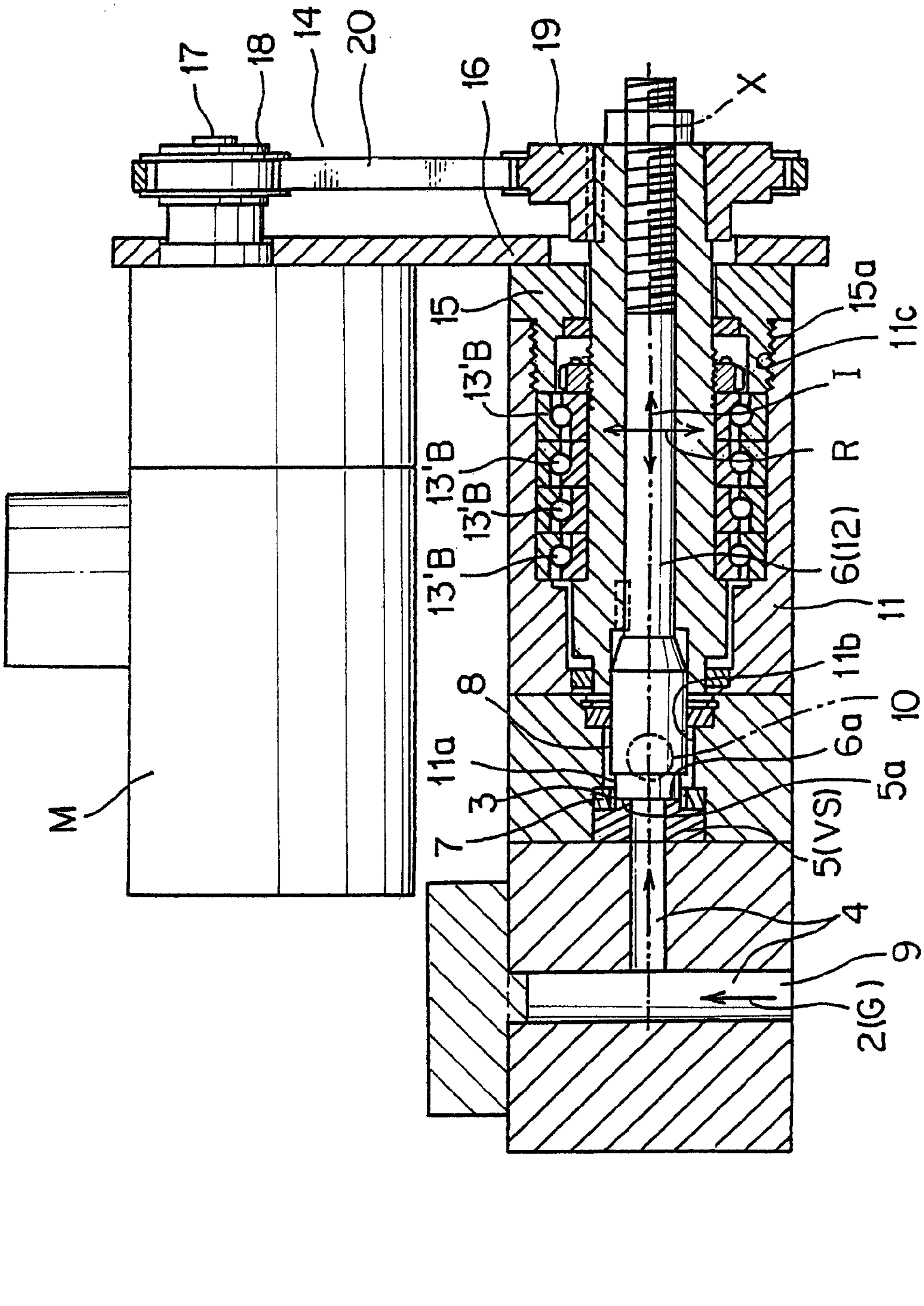
FIG. 3 is a sectional view showing a second embodiment of the injection valve of the high pressure homogenizer according to the present invention.

FIG. 3 shows a second embodiment of the injection valve of the high pressure homogenizer according to the present invention. According to the second embodiment, a plurality of ball bearings 13'B, for example four ball bearings 13'B, support rotatably the shaft valve 12 in the cylinder case 11. Three ball bearings 13'B are arranged in the same direction, and the other ball bearing 13'B is arranged in a different direction to increase sealing ability under high pressure. Without this feature, other structures and effects are the same as the first embodiment.

Third Embodiment

Figure 4:
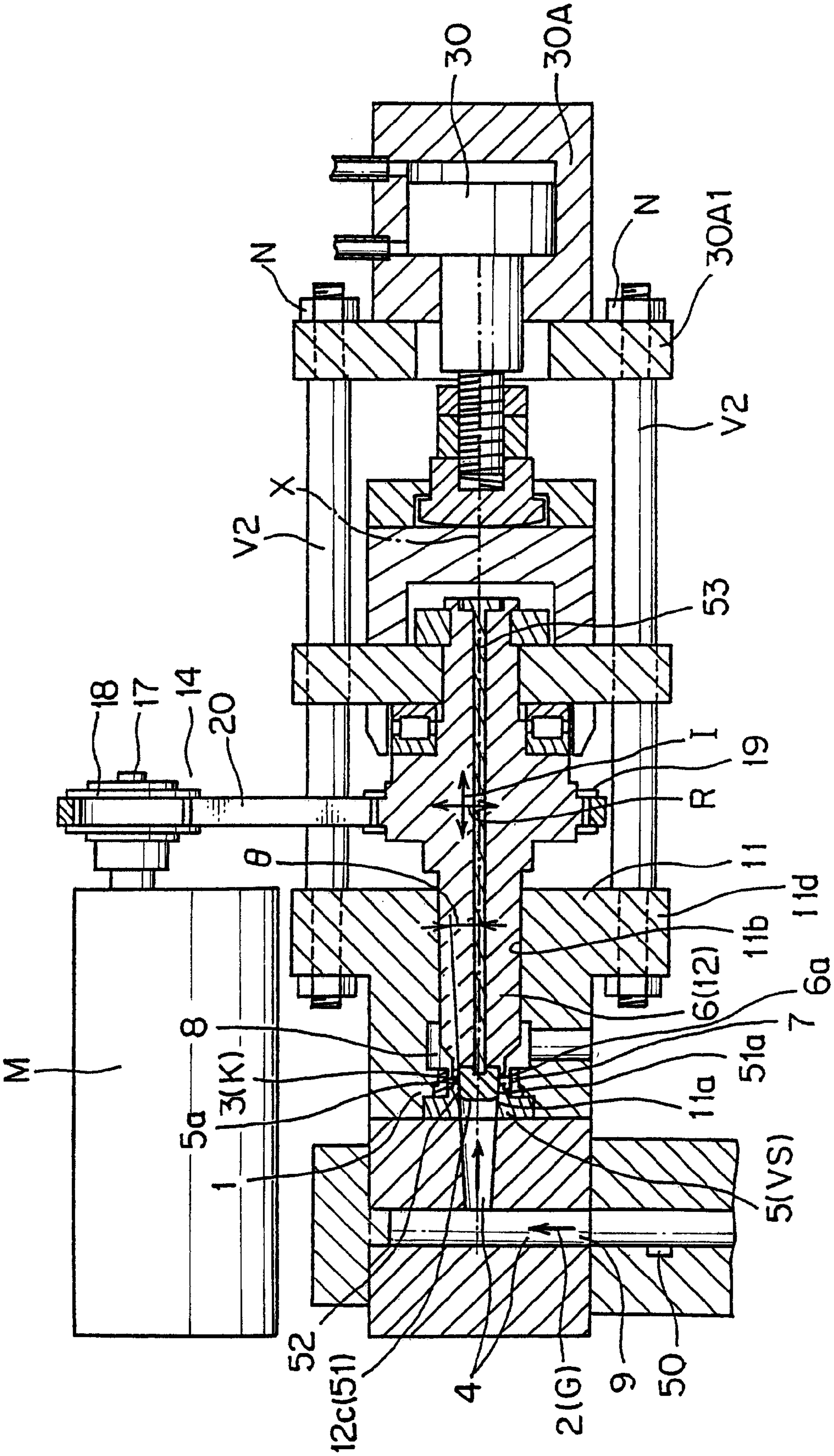
FIG. 4 is a sectional view showing a third embodiment of the injection valve of the high pressure homogenizer according to the present invention.
Figure 5:
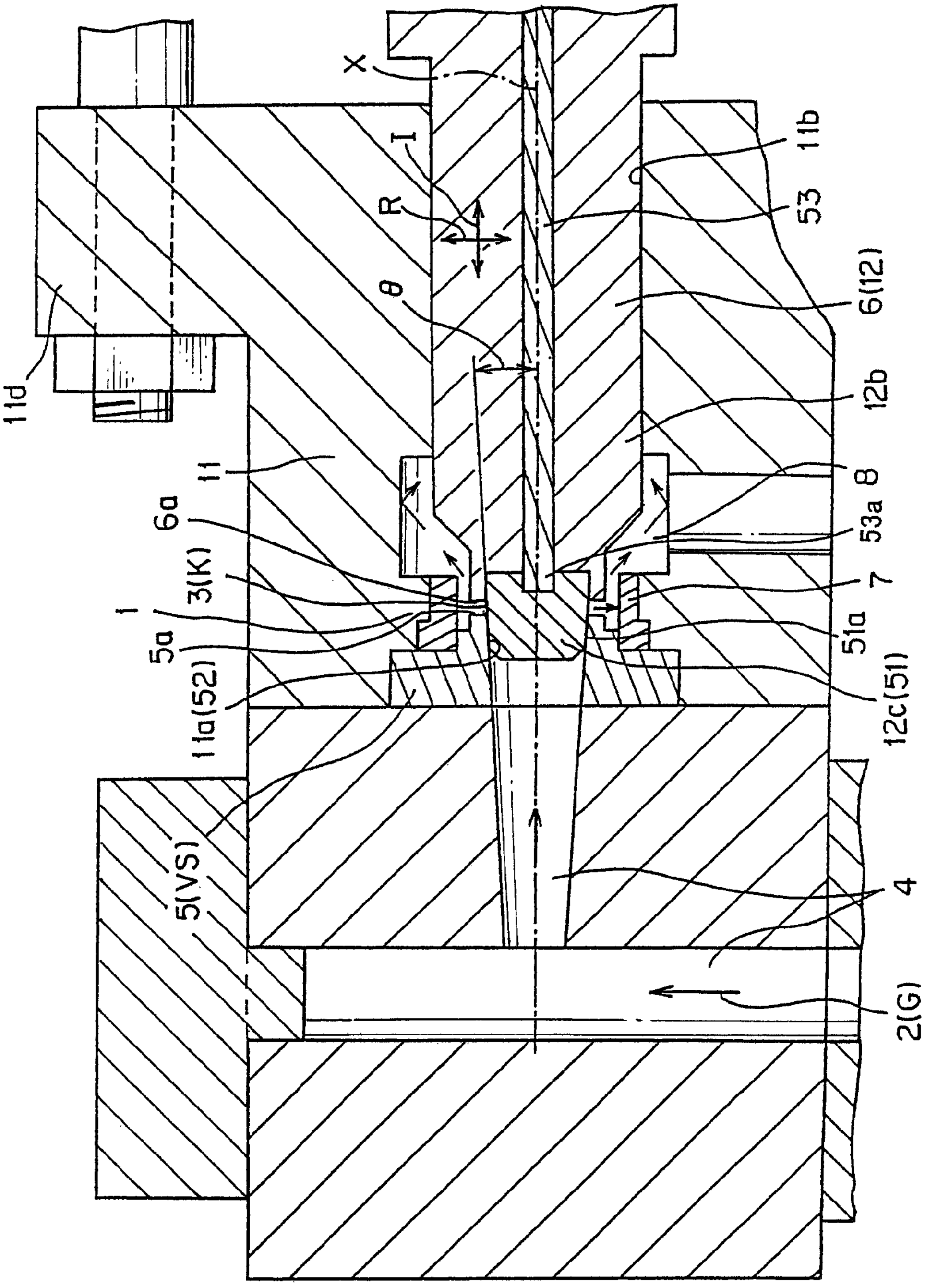
FIG. 5 is an enlarged sectional view showing the third embodiment.

FIGS. 4 and 5 show a third embodiment of the injection valve of the high pressure homogenizer according to the present invention. According to the third embodiment, the injection valve includes a pressure sensor 50 for detecting a compression pressure of the material G of a not shown booster mechanical section connected to the material introducing port 9, and the motor M for rotating the movable member 6 based on a detecting signal of the pressure sensor 50. Incidentally, a position of the pressure sensor 50 shown in FIG. 4 is merely for convenience of explanation.

Further, according to the third embodiment, a tip part 51 having an outer peripheral wall 51*a* inclined in a small angle θ with respect to an axial line X is formed on the movable member 6. The tip part 51 is loosely inserted into the small diameter receiving hole 11*a* having a sloped inner wall 52. The slope angle θ of the outer peripheral wall 51*a* of the sharp-pointed tip part 51 of the movable member 6 is 1 to 20 degree with respect to the axial line X. Thus, the orifice 3 as the small gap is easily and surely formed between the sloped inner wall 52 of the small diameter receiving hole 11*a* and the outer peripheral wall 51*a* of the tip member 12*c* of the shaft valve 12 by moving back and forth a little the shaft valve 12 as the movable member into the small diameter receiving hole 11*a* having the sloped inner wall 52 mounted on the valve seat VS as the fixed member. Namely, if the slope angle θ is more than 20 degrees, an insertion length of the tip member 12*c* to be inserted into the small diameter receiving hole 11*a* will be long, however, labor time for processing precisely the small diameter receiving hole 11*a* and the tip member 12*c* will be long. Further, if the slope angle θ is less than one degree, the labor time will be short, and manufacturing of the small diameter receiving hole 11*a* and the tip member 12*c* will be ease. Further, in such a case, the insertion length will be short, and the orifice 3 as the small gap will be easily made.

Further, according to the third embodiment, the tip part 51 is the tip member 12*c* made of metal, cermet, or cemented carbide, and detachably attached to the movable member 6 by screwing a tip 53*a* of a mounting bolt 53 into the movable member 6 in the axial direction X. Thus, the tip member 12*c* is easily replaced by loosing the mounting bolt 53. Thus, the tip member 12*c* is easily maintained.

Further, according to the third embodiment, the cylinder case 11 having a flange 11*d* is used. This cylinder case 11 faces a cylinder receiving case 30A. The flange lid and a flange 30A1 formed on the cylinder receiving case 30A are jointed by a plurality of bolts V2 and nuts N. Thus, the cylinder case 11 and the cylinder receiving case 30A are detachably jointed.

According to the third embodiment, when the pressure sensor 50 detects the compression pressure of the material G of the not-shown booster mechanical section as a specific pressure value, the motor M as the driving source rotates. The driving force of the motor M rotates normally or reversely the shaft valve 12 as the movable member 6 in a range of 10 to 100 rotations/min via the rotation transmitting member 14 such as the pulley 18, pulley 19, and the belt 20. Thus, because the shaft valve 12 as the movable member 6 is rotated due to the driving force of the motor M, and stirs and fluidizes the suspension liquid 2, even when the suspension liquid 2 is viscous, the orifice 3 is not plugged with the material G, discharging pressure is kept high, and the material G is effectively processed or segmentalized with high precision.

Further, the tip part 51 having an outer peripheral wall 51*a* inclined in a small angle θ, for example 1 to 20 degree, with respect to an axial line X is inserted into the small diameter receiving hole 11*a* having a sloped inner wall 52 movably back and fourth by the pressing force of the cylinder 30. Therefore, the orifice 3 having a minute gap K of less than 0.01 mm is easily maintained between the sloped inner wall 52 of the fixed member 5 and the sharp outer peripheral wall 51*a* of the movable member 6. Thus, the inner pressure of the orifice 3 is adjusted to high pressure such as 70 to 350 MPa or more than 350 MPa. Therefore, the material G is discharged swiftly from the orifice 3 under high pressure, and the material G is processed with a large differential pressure, and segmentalized with high precision.

Further, according to the third embodiment, when the orifice 3 is plugged with the material G, by slightly moving back or forth the shaft valve 12 due to the pressing force of the cylinder 30, a width of the gap K of the orifice 3 is changed to easily eject the plugged material G.

Further, according to the third embodiment, the tip part 51 is the tip member 12*c* made of metal, cermet, or cemented carbide, and detachably attached to the movable member 6 by screwing a tip 53*a* of a mounting bolt 53 into the movable member 6 in the axial direction X. Therefore, even when the material G is minute carbide solid, the material G is collided with the tip member 12*c* and smashed when the material G is swiftly discharged from the orifice 3. Then, the material G is surely discharged from the orifice 3 having the small gap K in a radial direction R, and collided with the collision wall 7 to further be segmentalized.

When the tip member 12*c* becomes worn, by screwing back the mounting bolt 53, and a new tip member 12*c* is replaced. Thus, the minute gap K such as less than 0.01 mm of the orifice 3 is easily maintained.

Further, according to the third embodiment, if the injection vale is unitized as the injection valve unit, the labor time of replacing the shaft valve 12, the tip member 12*c* or the like which becomes worn or degraded can be reduced.

Fourth Embodiment

Figure 6:
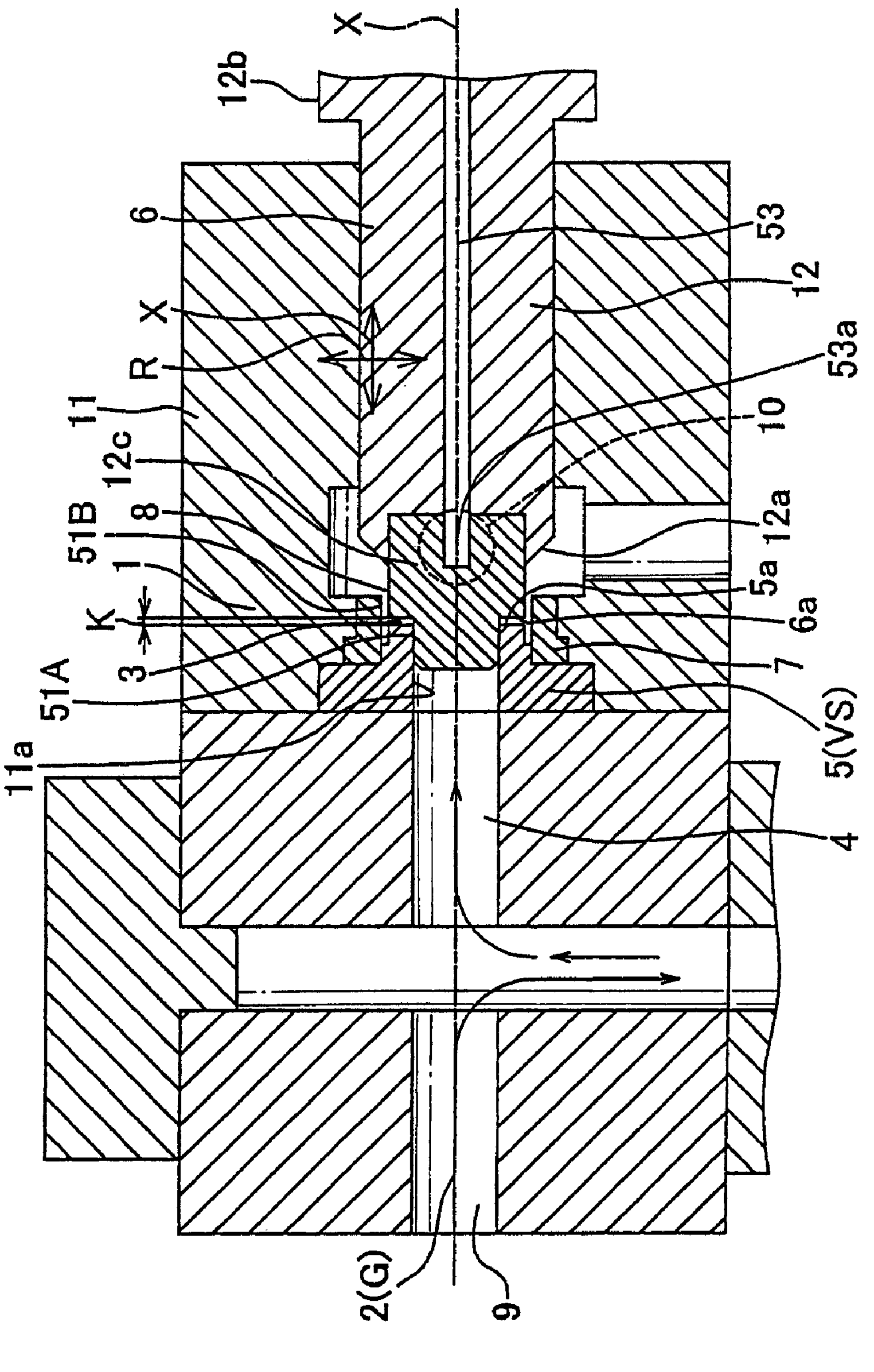
FIG. 6 is a sectional view showing a fourth embodiment of the injection valve of the high pressure homogenizer according to the present invention.

FIG. 6 shows a fourth embodiment of the injection valve of the high pressure homogenizer according to the present invention. According to the fourth embodiment, the tip member 12*c* is composed of a small diameter tip part 51A to be loosely inserted into the small diameter receiving hole 11*a*, and a large diameter ring-shaped shoulder part 51B opposed to the end face 5*a*. Thus, by reducing the abrasion and degradation of the tip member 12*c*, a mechanical lifetime of the tip member 12*c* can be longer than that in the third embodiment.

Fifth Embodiment

Figure 7:
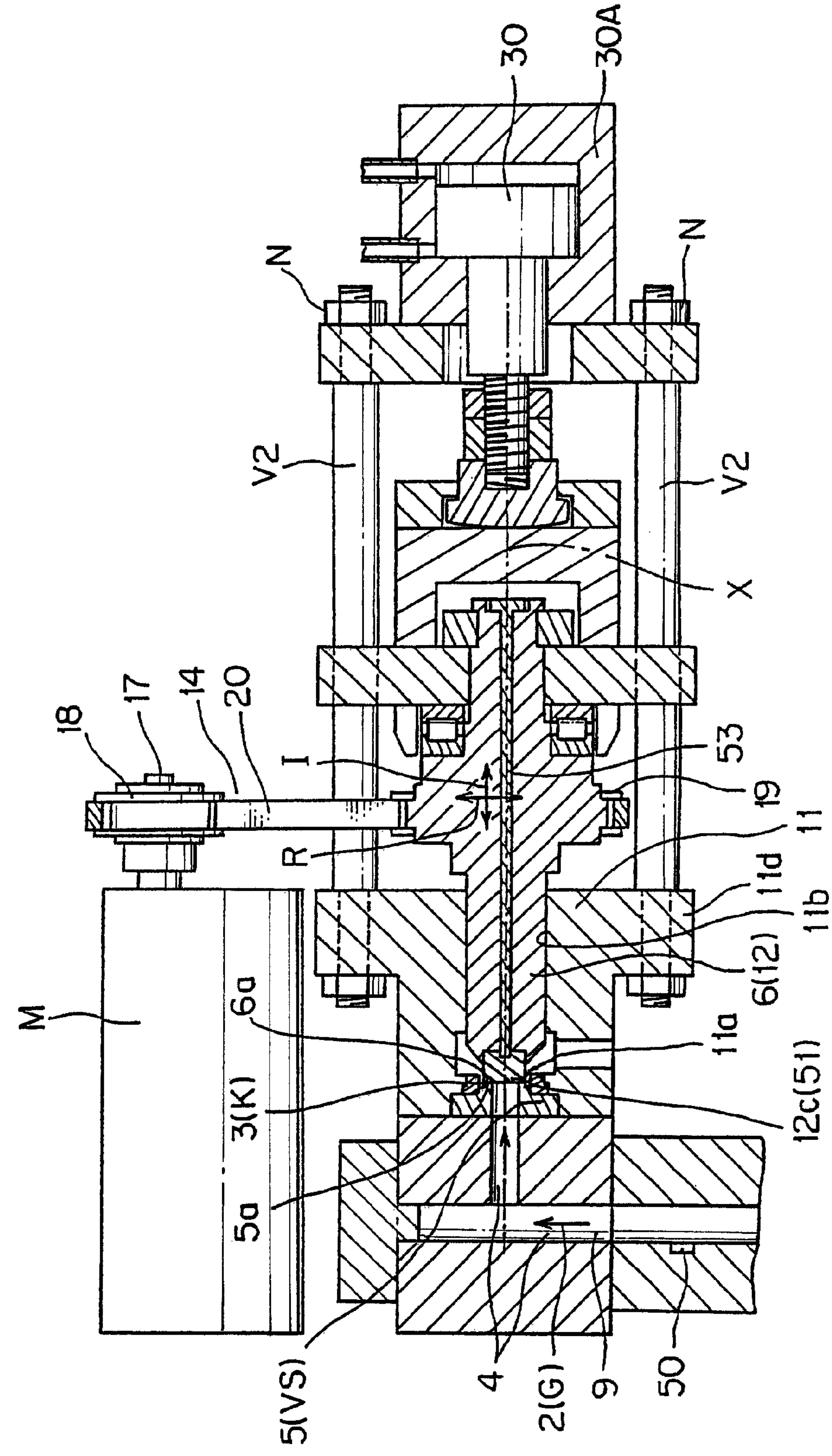
FIG. 7 is a sectional view showing a fifth embodiment of the injection valve of the high pressure homogenizer according to the present invention.

FIG. 7 shows a fifth embodiment of the injection valve of the high pressure homogenizer according to the present invention. According to the fifth embodiment, like the third embodiment, the tip member 12*c* as the tip part 51 is formed on the outer peripheral wall 51*a* inclined in a small angle θ with respect to an axial line X. According to the fifth embodiment, like the first embodiment, the minute gap K, for example less than 0.01 mm, in the radial direction R of the orifice 3 is formed between the end face 5*a* of the fixed member 5 and the end face 6*a* of the movable member 6.

Sixth Embodiment

FIGS. 8 to 11 show a sixth embodiment of the injection valve of the high pressure homogenizer according to the present invention. According to the sixth embodiment, the material introducing port 9 communicating to the material introducing passage 4 is formed on one side of the cylinder case 11. A direction switching passage 80 for adjusting the gap K of the orifice 3 by moving back and forth the movable member 6 with respect to the valve seat VS is formed on an inside of the cylinder case 11. A plurality of cylinder case blocks 81A, 81B, 81C, 81D, 81E are integrally and connectably provided in the axial direction I via the connecting members 82.

Further, the cylinder case 11 at least connects in the axial direction I, the cylinder case block 81B having an inner pressure adjusting valve setting area N1 on which the orifice 3 is formed, the cylinder case block 81C having a power introducing area N2 for introducing the driving force of the motor M via the rotation transmitting member 14, and the other cylinder case blocks 81D, 81E having the direction switching passage 80 composed of forward pressure introducing passages 83*a*, 83*b* for moving forward the movable member 6 with respect to the valve seat VS, and/or a backward pressure introducing passage 83*c* for moving backward the movable member 6 with respect to the valve seat VS.

Further, a plurality of guiding rods 84 (two guiding rods in FIG. 11) are projected from one side or both sides of any one of the cylinder case blocks, for example, the cylinder case block 81E, and movably penetrates the other cylinder blocks 81A, 81B, 81C, 81D via bearings 85 in the axial direction I. Therefore, in FIG. 11, by releasing from bolts 90 as the connecting members 82, the other cylinder blocks 81A, 81B, 81C, 81D are separated from each other movably along the guiding rods 84.

Further, according to the sixth embodiment, the shaft valve 12 as the movable member 6 is formed in a substantially cylinder shape composed of a front half 12A and a rear half 12B to be easily separated, processed, and moved. Further, the shaft valve 12 is rotatably supported in the interior of the cylinder case 11 via the thrust bearings 13A and the roller bearings 13B. Further, the shaft valve 12 is provided rotatably, swingably, or pulsatingly via the rotation transmitting member 14 mounted on the substantially center of the shaft valve 12 due to the driving force of the motor M.

Further, the tip member 12*c* of the movable member 6 is composed of the small diameter tip part 51A and the large diameter ring-shaped shoulder part 51B formed on the outer periphery of the small diameter tip part 51A at the rear side thereof. The small diameter tip part 51A is loosely inserted into a cone-shaped small diameter receiving hole 11*a*' having the sloped inner wall 52 formed on an inner periphery of the fixed member 5 movably back and forth.

A first spill part 86 is formed on the outer periphery at the substantially center of the movable member 6 for receiving the pressure supplied from the forward pressure introducing passage 83*b* formed on the cylinder case 11. A second spill part 87 is formed on the outer periphery at the rear side of the movable member 6 for receiving the pressure from both the forward pressure introducing passage 83*a* and the backward pressure introducing passage 83*c*.

The small diameter tip part 51A is detachably attached to the tip of the movable member 6 by screwing the tip 53*a* of a mounting bolt 53 into the movable member 6 in the axial direction X. Further, the small diameter tip part 51A is composed of the tip member 12*c* made of cemented carbide.

Figure 8:
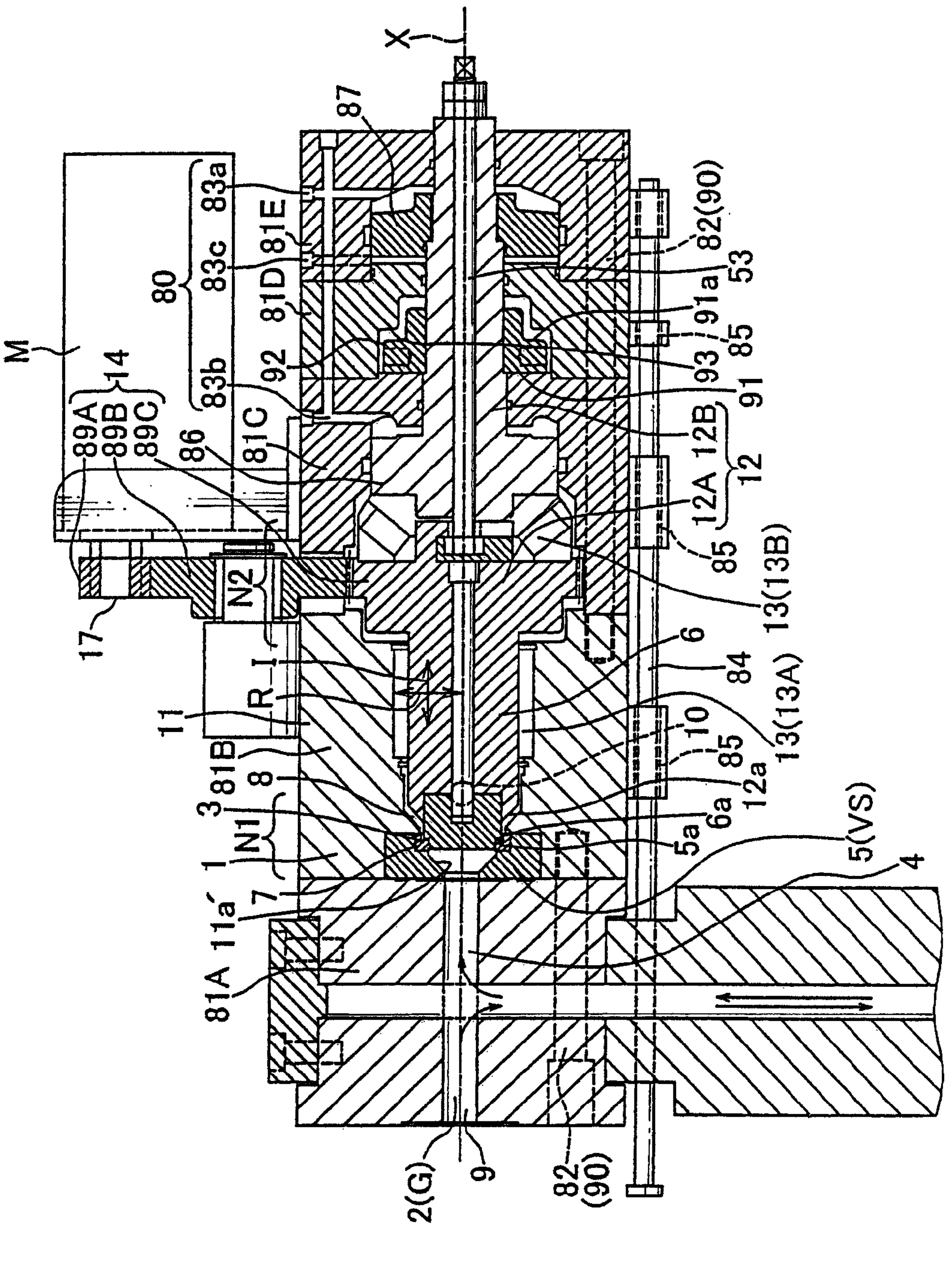
FIG. 8 is a sectional view showing a sixth embodiment of the injection valve of the high pressure homogenizer according to the present invention.
Figure 10:
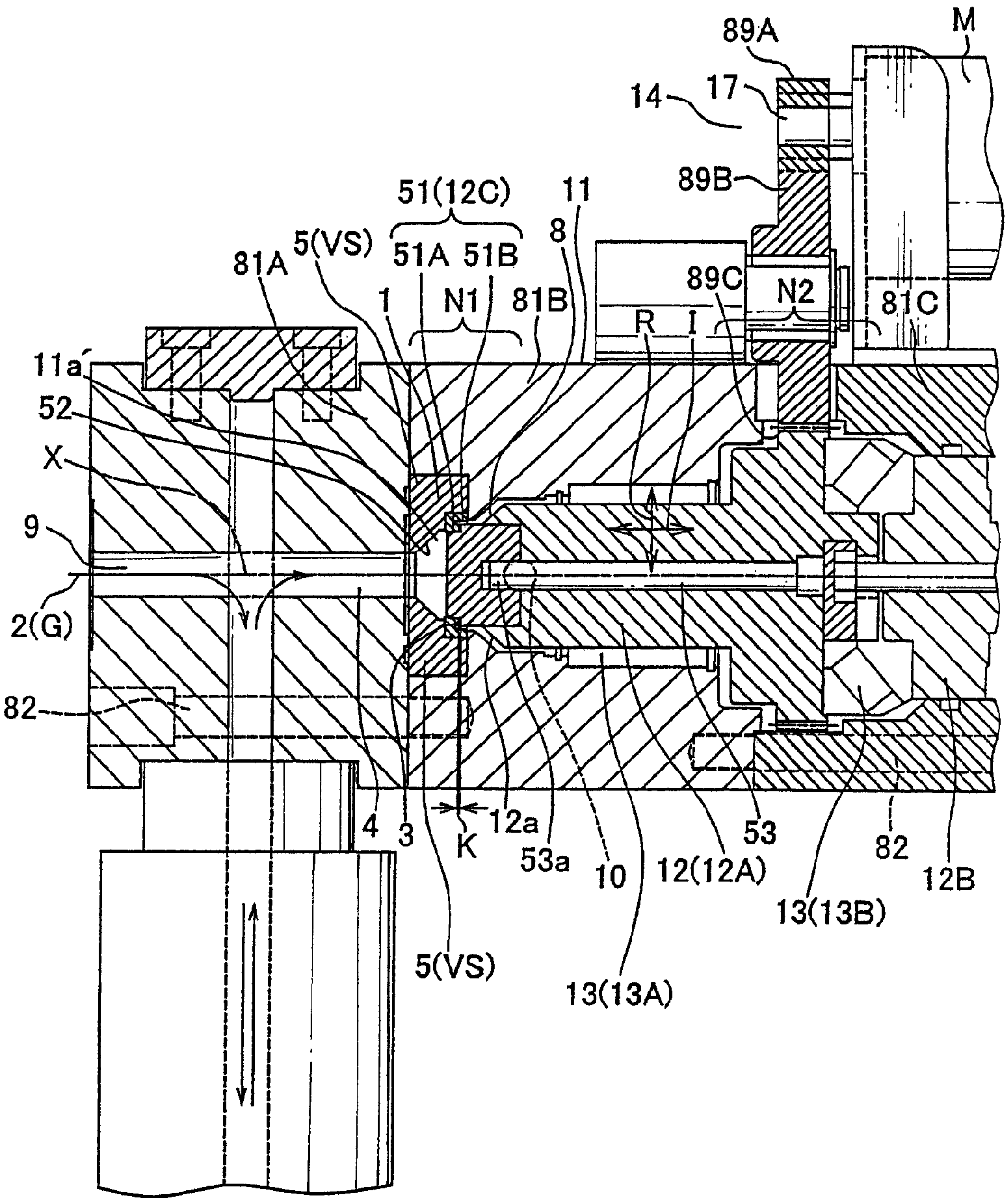
FIG. 10 is an enlarged sectional view showing an orifice of the injection valve of the high pressure homogenizer according to the sixth embodiment of the present invention.
Figure 11:
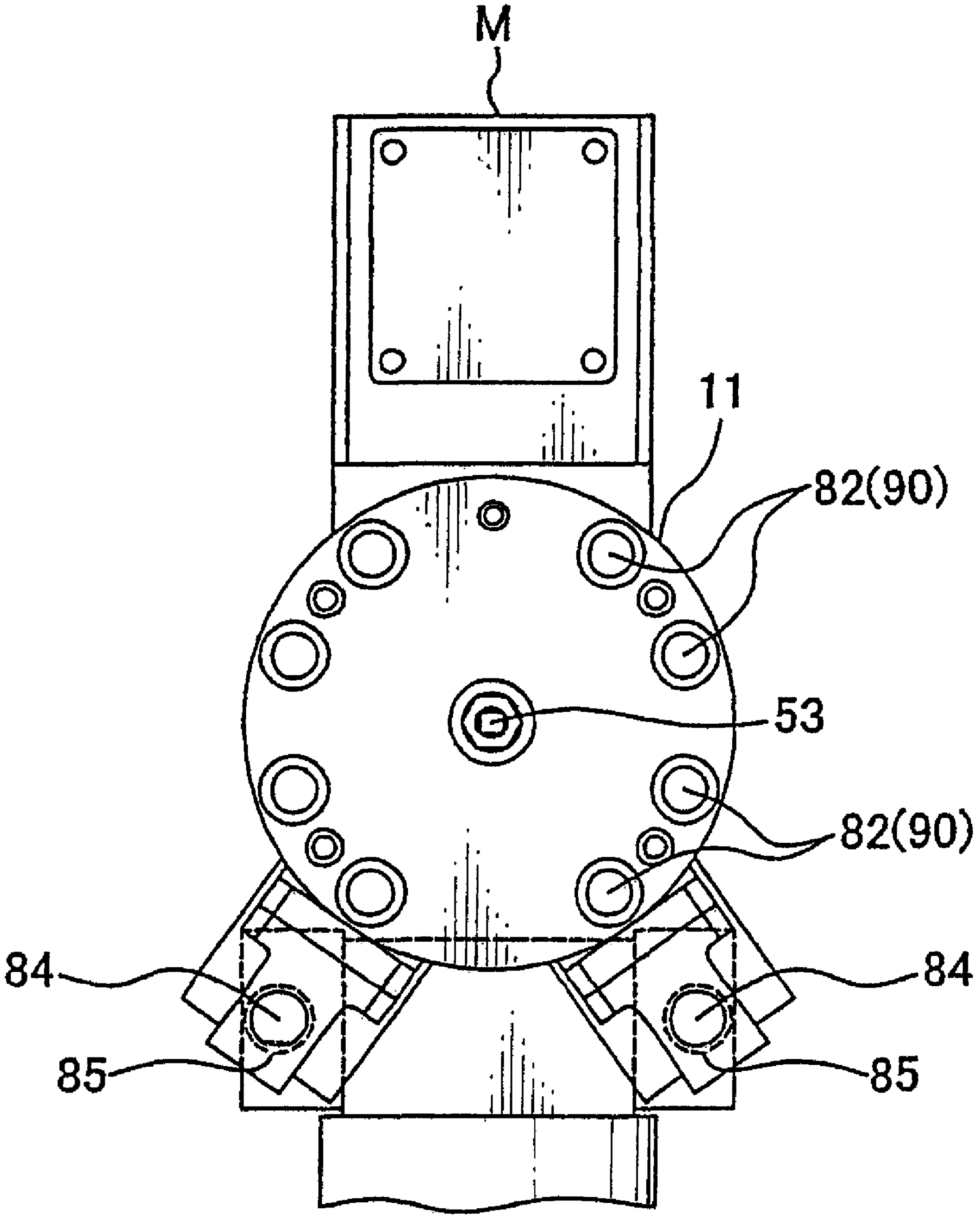
FIG. 11 is a side view showing the injection valve of the high pressure homogenizer according to the sixth embodiment of the present invention.

Further, according to the sixth embodiment, the rotation transmitting member 14 is composed of gears including a driving gear 89A mounted on the motor shaft 17. Namely, as shown in FIGS. 8 and 10, the rotation transmitting member 14 of the sixth embodiment is composed of the driving gear 89A mounted on the motor shaft 17, an intermediate gear 89B meshing with the driving gear 89A, and a large-diameter receiving gear 89C meshing with the intermediate gear 89B.

Further, the connecting members 82 are a plurality of bolts 90 screwed into the cylinder case blocks 81A, 81B, 81C, 81D, 81E and separatably integrated with them.

According to the sixth embodiment, a stopper 91 is formed on the outer periphery at the rear side of the movable member 6 and received in a receiving recess 92 formed on the front side of the cylinder case block 81D. A forward movement of the movable member 6 is stopped by the stopper 91 bumping on a rear wall of the cylinder case block 81C. Further, a backward movement of the movable member 6 is stopped by locking a large diameter locking part 91*a* of the stopper 91 with a locking step 93.

Further, according to the sixth embodiment, a desired amount of the suspension liquid 2 including the material G is absorbed via the material introducing port 9 at each cycle of an absorbing process. Then, the material G is compressed in high pressure by the not-shown booster mechanical section. Then, the material G is passed through the orifice 3 mounted on the high pressure homogenization mechanical section 1 with a high speed in high pressure so that the material G is homogenized or segmentalized to be dispersed, emulsified, atomized, or cells of the material G are disrupted.

Figure 9:
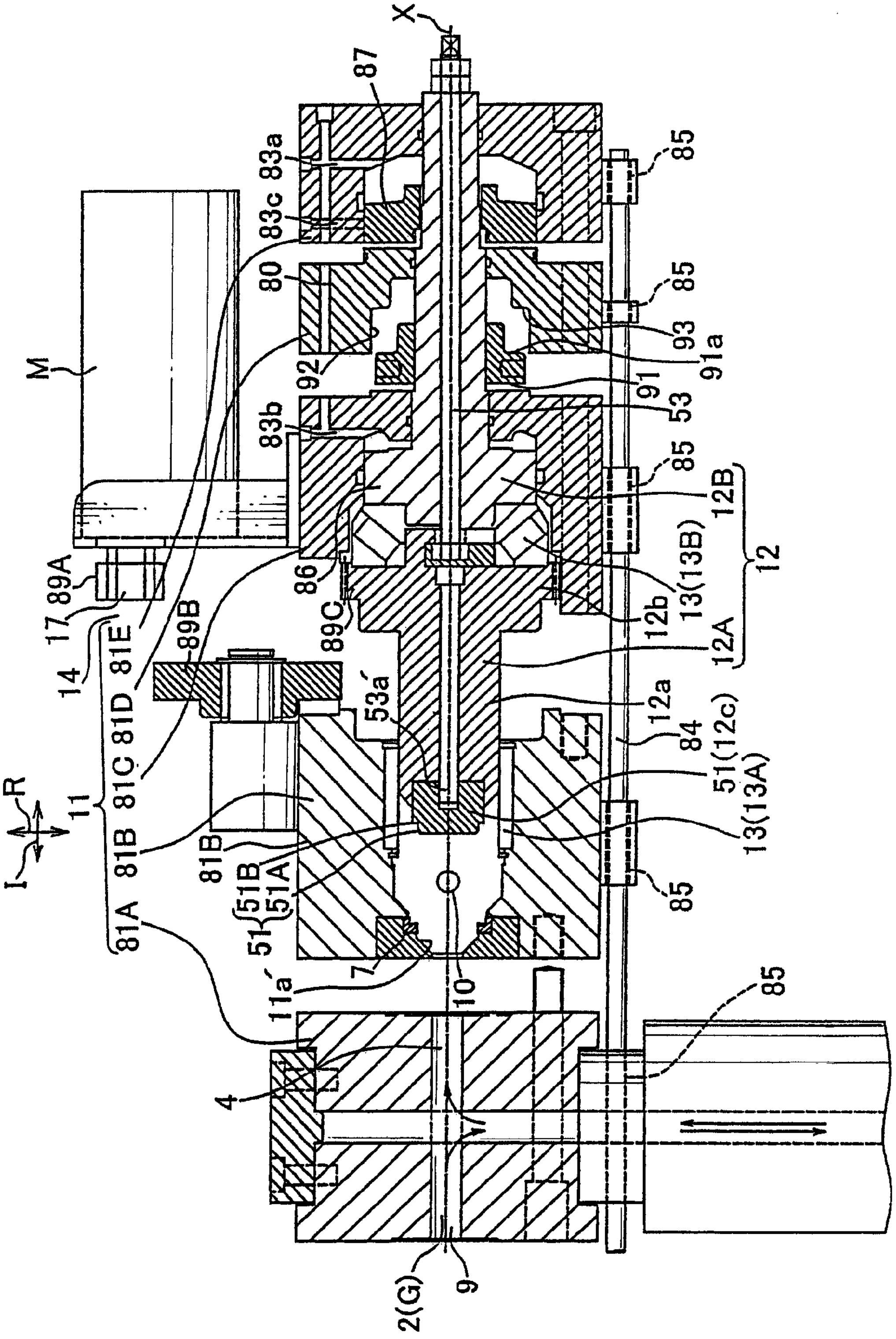
FIG. 9 is a sectional view showing separated cylinder case blocks in a cylinder case of the injection valve of the high pressure homogenizer according to the sixth embodiment of the present invention.

Incidentally, according to the sixth embodiment, as shown in FIGS. 9 and 10, the small diameter tip part 51A is formed on the movable member 6, and is movable back and forth with respect to the cone-shaped small diameter receiving hole 11*a*'. Therefore, the shaft valve 12 as the movable member 6 is moved forward with respect to the valve seat VS as the fixed member 5 when the rear walls of the first spill part 86 and the second spill part 87 receive the pressure such as oil pressure supplied via the forward pressure introducing passages 83*a*, 83*b*. Further, when the front wall of the second spill part 87 receives the pressure supplied via the backward pressure introducing passage 83*c* formed on the cylinder case block 81D, the shaft valve 12 is moved backward with respect to the valve seat VS. Thus, the width of the gap K of the minute orifice 3 is adjusted.

Thus, the cylinder case 11 includes the fixed member 5 including internally the material introducing passage 4, and the shaft valve 12 as the movable member 6 disposed rotatably, swingably, or pulsatingly opposite to the fixed member 5 in an axial direction of the fixed member 5. Further, The orifice 3 having a minute gap K, for example less than 0.01 mm is formed between the end face 5*a* of the fixed member 5 facing an end of the material introducing passage 4 and the end face 6*a* of the movable member 6 disposed at an end of the movable member 6 opposed to the fixed member 5. Therefore, the suspension liquid 2 including the material G is guided into the high pressure homogenization mechanical section 1 via the material introducing port 9, compressed in high pressure by the not-shown booster mechanical section, and discharged swiftly via the orifice 3. Thus, the material G is dispersed due to the large pressure difference, and collided with the tip member 12*c* made of cemented carbide, then collided again with the ring-shaped collision wall 7 formed on the outer periphery of the orifice 3 and on the inner periphery of the cone-shaped small diameter receiving hole 11*a*'. Thus, the material G is effectively segmentalized or homogenized.

Further, as described the above, the forward pressure introducing passages 83*a*, 83*b* are formed on the interiors of the cylinder block cases 81E, 81C in the cylinder case 11 and the backward pressure introducing passage 83*c* is formed on the interior of the cylinder case block 81E. Therefore, the interior of the cylinder case 11 is highly gas tight. Therefore, the response of moving the shaft valve 12 as the movable member 6 forward and backward or stopping the shaft valve 12 is rapid, and the shaft valve 12 is finely controlled with high precision.

At this time, the movable member 6 is moved forward or backward against the high pressure due to the discharge of the material G via the orifice 3, so that the gap K of the orifice 3 is correctly kept. Therefore, the orifice 3 is not plugged with the material G, and the high pressure homogenizer can be continuously operated. Further, the gap K of the orifice 3 can be finely adjusted corresponding to the hardness or the size of the material G. Therefore, unintentional leak of the material G via the orifice 3 is prevented and the material G is effectively segmentalized or homogenized in high pressure with high precision.

Further, the shaft valve 12 as the movable member 6 is supported normally or reversely rotatably, swingably, or pulsatingly in the cylinder case 11 via a roller bearing member 13. Therefore, when the not-shown sensor detects that the compression pressure of the material G at the not-shown booster mechanical section is a predetermined value, the motor M as the driving source is driven and rotated according to the detecting signal of the pressure sensor. Therefore, the shaft valve 12 is rotated in a range of 10 to 100 rotations/min via the driving gear 89A, the intermediate gear 89B, and the receiving gear 89C as the rotation transmitting member 14 arranged at the other end thereof without any deviation in both the radial direction R and the axial direction I. Thus, because the shaft valve 12 as the movable member 6 is rotated due to the driving force of the motor M, and stirs and fluidizes the suspension liquid 2, even when the suspension liquid 2 is viscous, the orifice 3 is not plugged with the material G, discharging pressure is kept high, and the material G is effectively segmentalized or homogenized with high precision.

Incidentally, when the tip member 12*c* is abraded by collided with the hard material G included in the suspension liquid 2 discharged via the orifice 3, the abraded tip member 12*c* is detached from the mounting bolt 53 and replaced with the new tip member 12*c* by screwing back the mounting bolt 53.

Further, according to the sixth embodiment, the cylinder case 11 is composed of the cylinder case block 81A, the cylinder case block 81B having the inner pressure adjusting valve setting area N1 in which the orifice 3 is formed, the cylinder case block 81C having the power introducing area N2 in which the driving force of the motor M is introduced via the rotation transmitting member 14, the cylinder case blocks 81E, 81C in which the forward pressure introducing passages 83*a*, 83*b* are formed for moving forward the movable member 6 with respect to the valve seat VS as the fixed member 5, and the cylinder case block 81E in which the backward pressure introducing passage 83*c* is formed for moving backward the movable member 6 with respect to the valve seat VS. These cylinder case blocks 81A, 81B, 81C, 81D, 81E are connected by the bolts 90 as the connecting members 82 in the axial direction I. Therefore, when the suspension liquid 2 is viscous and the orifice 3 is plugged with the material G, the connection of the cylinder case blocks 81A, 81B, 81C, 81D, 81E is released, and the cylinder case blocks 81A, 81B, 81C, 81D, 81E are moved along the balanced guiding rods 84 in the axial direction and separated from each other (see FIG. 9).

At this time, because the cylinder case blocks 81A, 81B, 81C, 81D, 81E are moved along the balanced guiding rods 84 in the axial direction I via the bearings 85, even when the cylinder case blocks 81A, 81B, 81C, 81D, 81E are heavy, only by pressing lightly the cylinder case blocks 81A, 81B, 81C, 81D, 81E, they are moved easily and smoothly. After the cylinder case blocks 81A, 81B, 81C, 81D, 81E are separated from each other, spaces are generated for easily replacing the abraded shaft valve 12, the abraded driving gear 89A, the abraded intermediate gear 89B, or the abraded receiving gear 89C with the new ones. Further, when the orifice 3 is plugged with the material G, it is easy to clean the orifice 3.

After replacing the parts or cleaning the orifice 3, the cylinder case blocks 81A, 81B, 81C, 81D, 81E are moved back along the balanced guiding rods 84 in the axial direction I to be connected with each other by the bolts 90. Thus, parts of the high pressure homogenizer are easily replaced, and the maintenance of the high pressure homogenizer is easy.

Seventh Embodiment

FIGS. 12 to 17 show a seventh embodiment of the injection valve of the high pressure homogenizer according to the present invention. According to the seventh embodiment, the material introducing port 9 communicating with the material introducing passage 4 is disposed at one side of the cylinder case 11, the material exhausting port 10 is disposed at the rear of the orifice 3, the direction switching passage 80 for adjusting the gap K of the orifice 3 by moving forward or backward the movable member 6 with respect to the valve seat VS is formed in the interior of the cylinder case 11, and the cylinder case blocks 81A, 81B, 81C, 81D, 81E are connected to each other in the axial direction I via the connecting members 82.

Further, the cylinder case 11 at least connects in the axial direction I the cylinder case block 81B having the inner pressure adjusting valve setting area N1 in which the orifice 3 is formed, the cylinder case block 81C having the power introducing area N2 in which the driving force of the motor M is introduced via the rotation transmitting member 14, the cylinder case blocks 81C, 81D, 81E having the direction switching passage 80 composed of the forward pressure introducing passages 83*a*, 83*b* for moving forward the movable member 6 with respect to the valve seat VS as the fixed member 5, and the backward pressure introducing passage 83*c* for moving backward the movable member 6 with respect to the valve seat VS.

Further, a plurality of guiding rods 84 (two guiding rods in FIG. 14) are projected from one side or both sides of any one of the cylinder case blocks, for example, the cylinder case block 81E, and movably penetrates the other cylinder blocks 81A, 81B, 81C, 81D via bearings 85 in the axial direction I. Therefore, for example in FIGS. 12, 13, 17, by releasing from the connecting members 82, the other cylinder blocks 81A, 81B, 81C, 81D are separated from each other movably along the guiding rods 84.

However, according to the seventh embodiment, in a normal time when the material G is segmentalized, dispersed, emulsified, atomized, or cells of the material are disrupted, while the several cylinder case blocks 81A, 81B, 81C, 81D, 81E are movably supported by the guiding rods 84, the several cylinder case blocks 81A, 81B, 81C, 81D, 81E are unmovably connected by the connecting members 82 at a setting position S in the substantially center in a width direction W of supporting rods 101 disposed right and left of an attaching base 100. Further, either one of the cylinder case blocks 81A, 81B, 81C, 81D, 81E or the connecting members 82, in the seventh embodiment the cylinder case blocks 81A, 81B, 81C, 81D, 81E are elevatably supported by an elevating cylinder 102 with respect to the connecting members 82. In a maintenance time when the parts are replaced or the interior of the injection valve is cleaned, either one of the cylinder case blocks 81A, 81B, 81C, 81D, 81E or the connecting members 82, in the seventh embodiment the cylinder case blocks 81A, 81B, 81C, 81D, 81E are moved upward in a movement allowing height h, which allows the guiding rods 84 to move in the lateral direction H, L, with respect to the connecting members 82 by the elevating cylinder 102.

Further, according to the seventh embodiment, the connecting members 82 are clipping cylinders 103 to couple the cylinder case blocks 81A, 81B, 81C, 81D, 81E moved down to the setting position S (see FIG. 12) onto the attaching base 100. A first spill part 103*b* and a second spill part 103*c* are formed on an outer periphery of a cylinder rod 103*a* of the clipping cylinder 103. A stopper 103*d* is formed at one ends of the supporting rods 101 opposed to the clipping cylinder 103. The stopper 103*d* and the clipping cylinder 103 work together to clip and connect the cylinder case blocks 81A, 81B, 81C, 81D, 81E at the setting position S. Incidentally, according to the seventh embodiment, only the right side clipping cylinders 103 is shown in FIGS. 12, 13, 15, 16, 17. However, the clipping cylinders 103 are disposed at right and left sides opposed to each other. The cylinder rods 103*a* press the cylinder case blocks 81A, 81B, 81C, 81D, 81E to clip them. The two clipping cylinders allows to rapidly and surely clip and release the cylinder rods 103*a* press the cylinder case blocks 81A, 81B, 81C, 81D, 81E.

Further, according to the seventh embodiment, a cylinder 104 for opening and closing the material introducing port 9 is used to control a feed rate of the material G. Spacers 105A, 105B having substantially a horseshoe shape are detachably inserted into unnecessary gaps formed at both ends of the cylinder case blocks 81A, 81B, 81C, 81D, 81E to allow the high pressure homogenization mechanical section 1 to be positioned due to the clipping force of the clipping cylinders 103.

Figure 12:
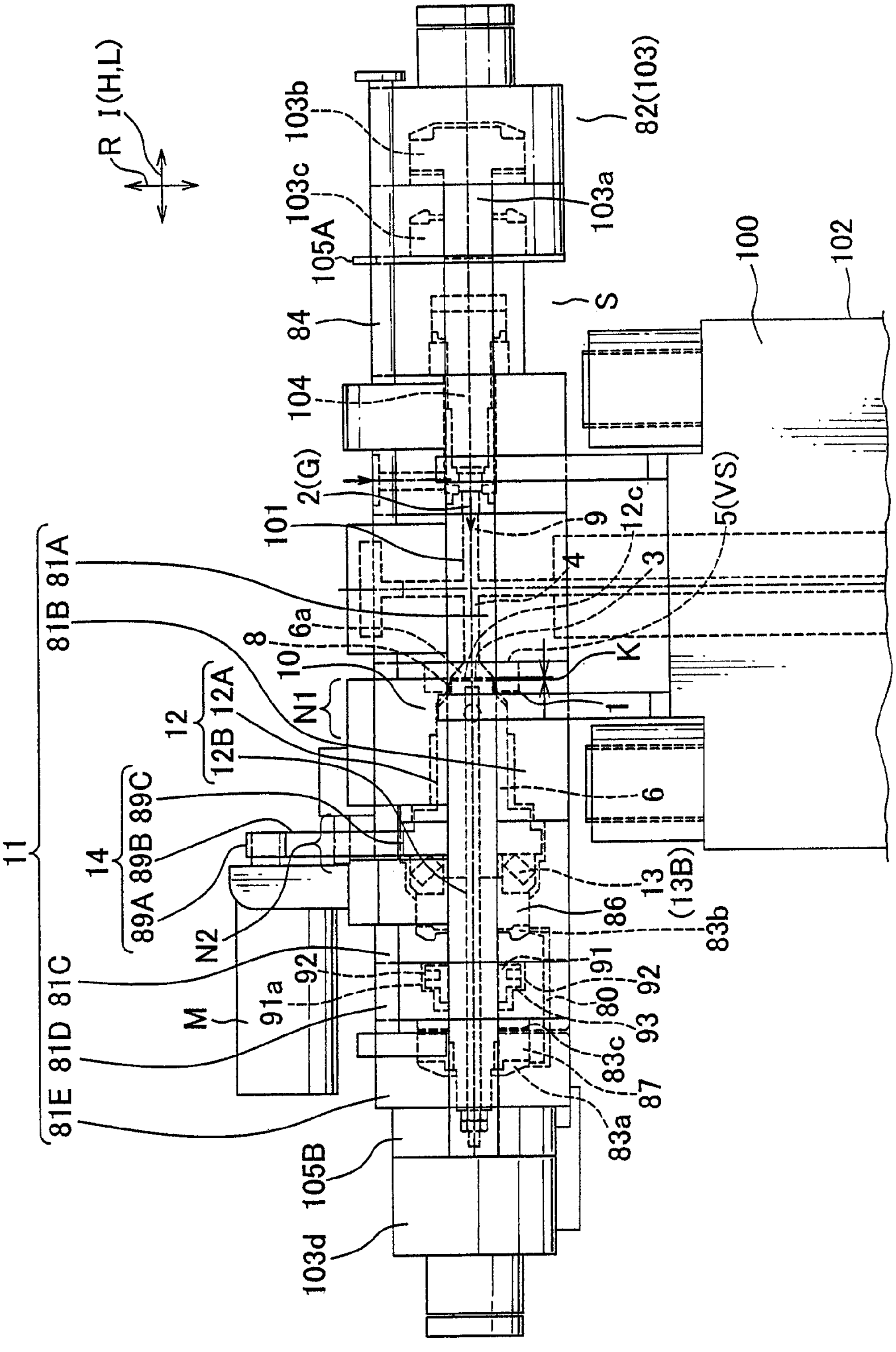
FIG. 12 is a front view showing a seventh embodiment of the injection valve of the high pressure homogenizer according to the present invention.
Figure 13:
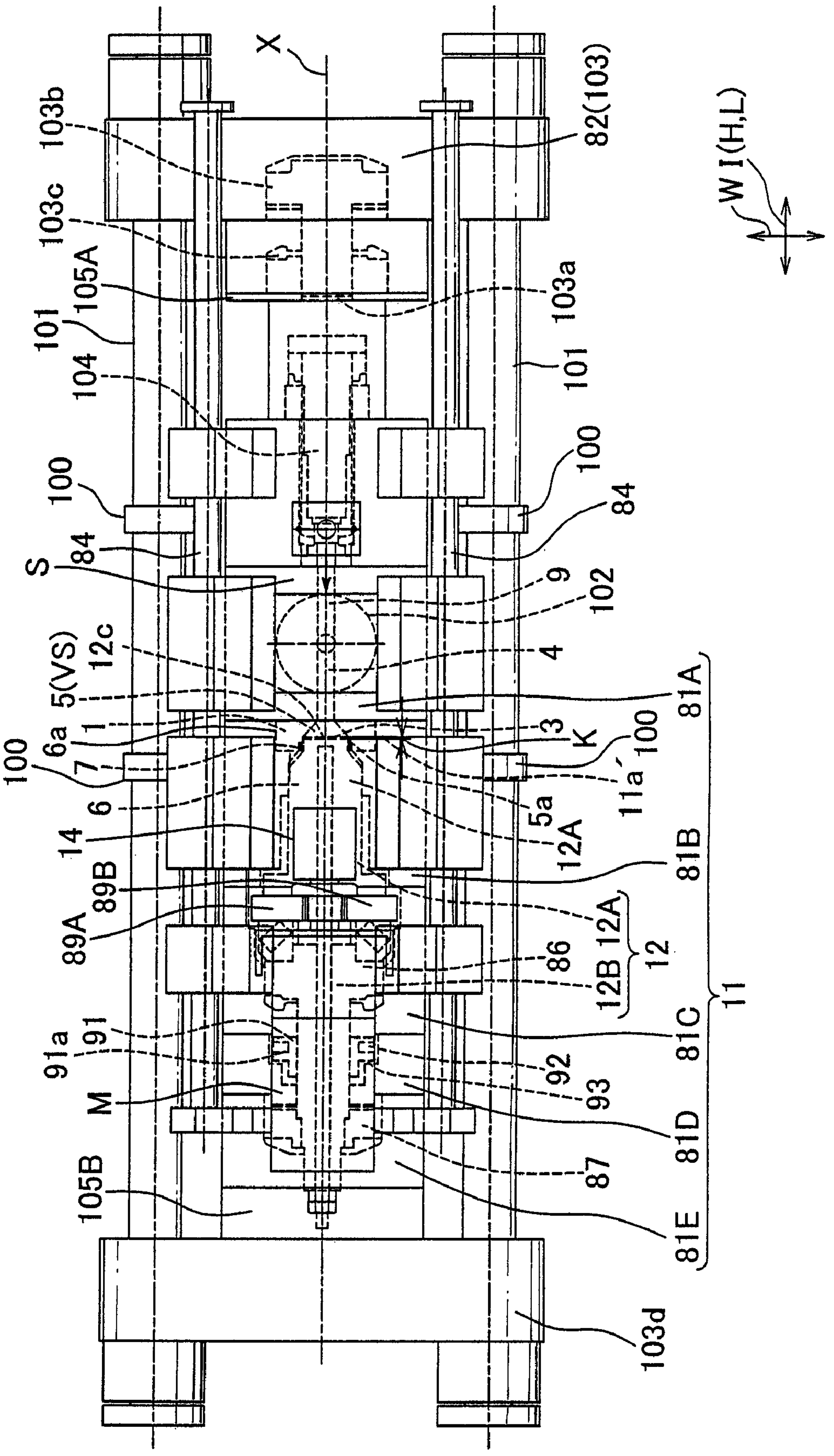
FIG. 13 is a plan view of the same.
Figure 14:
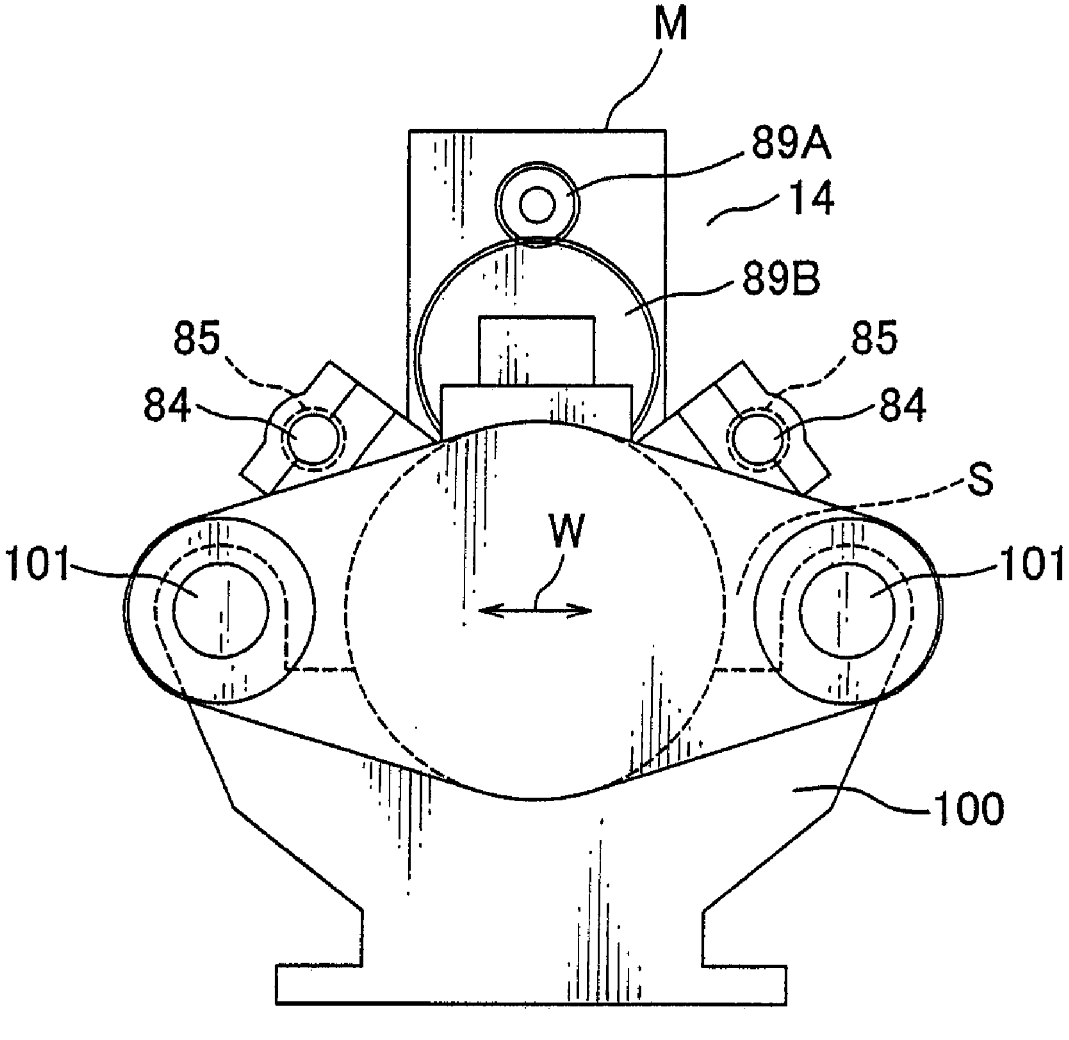
FIG. 14 is an enlarged side view of the same.
Figure 15:
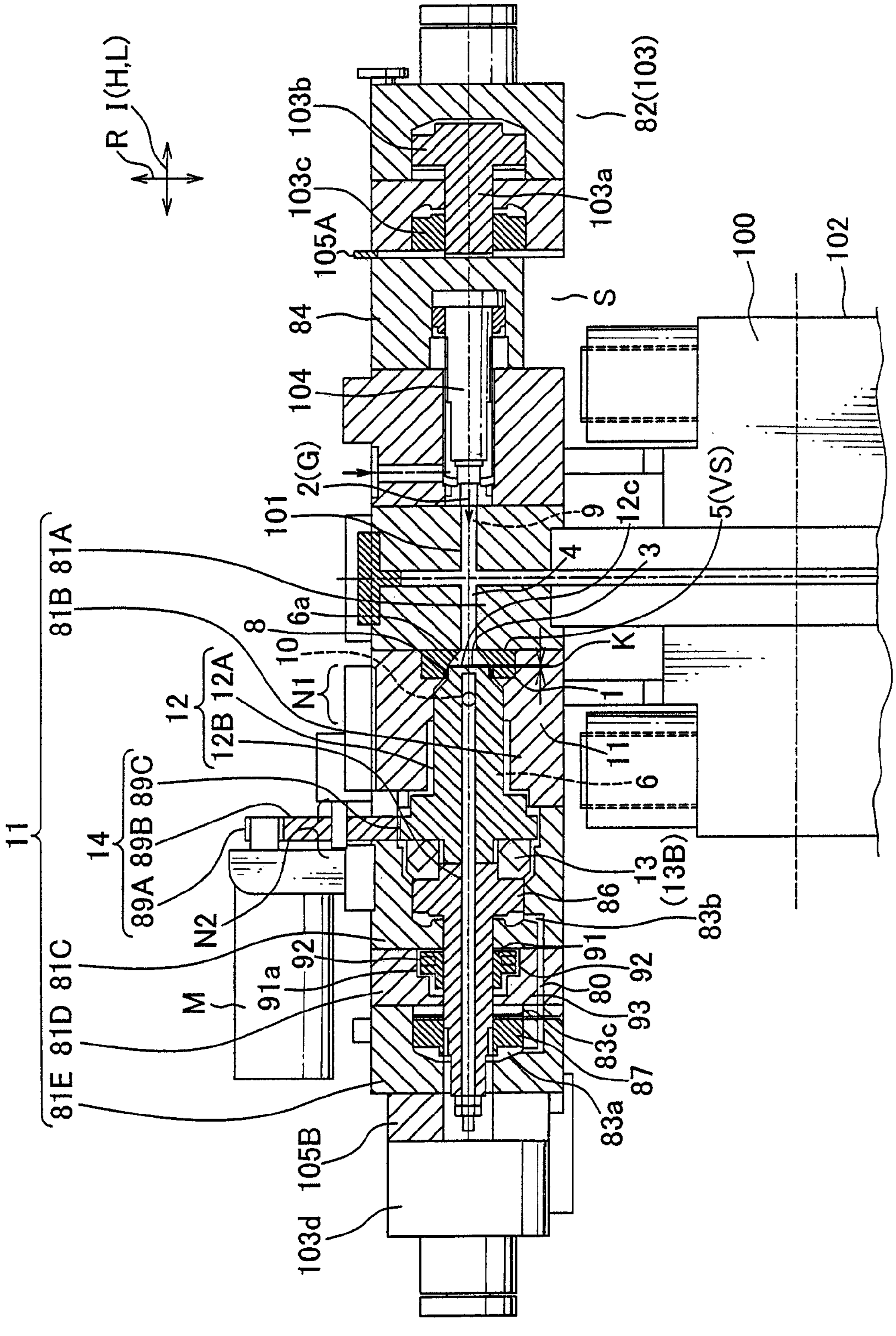
FIG. 15 is a sectional view of the same.
Figure 16:
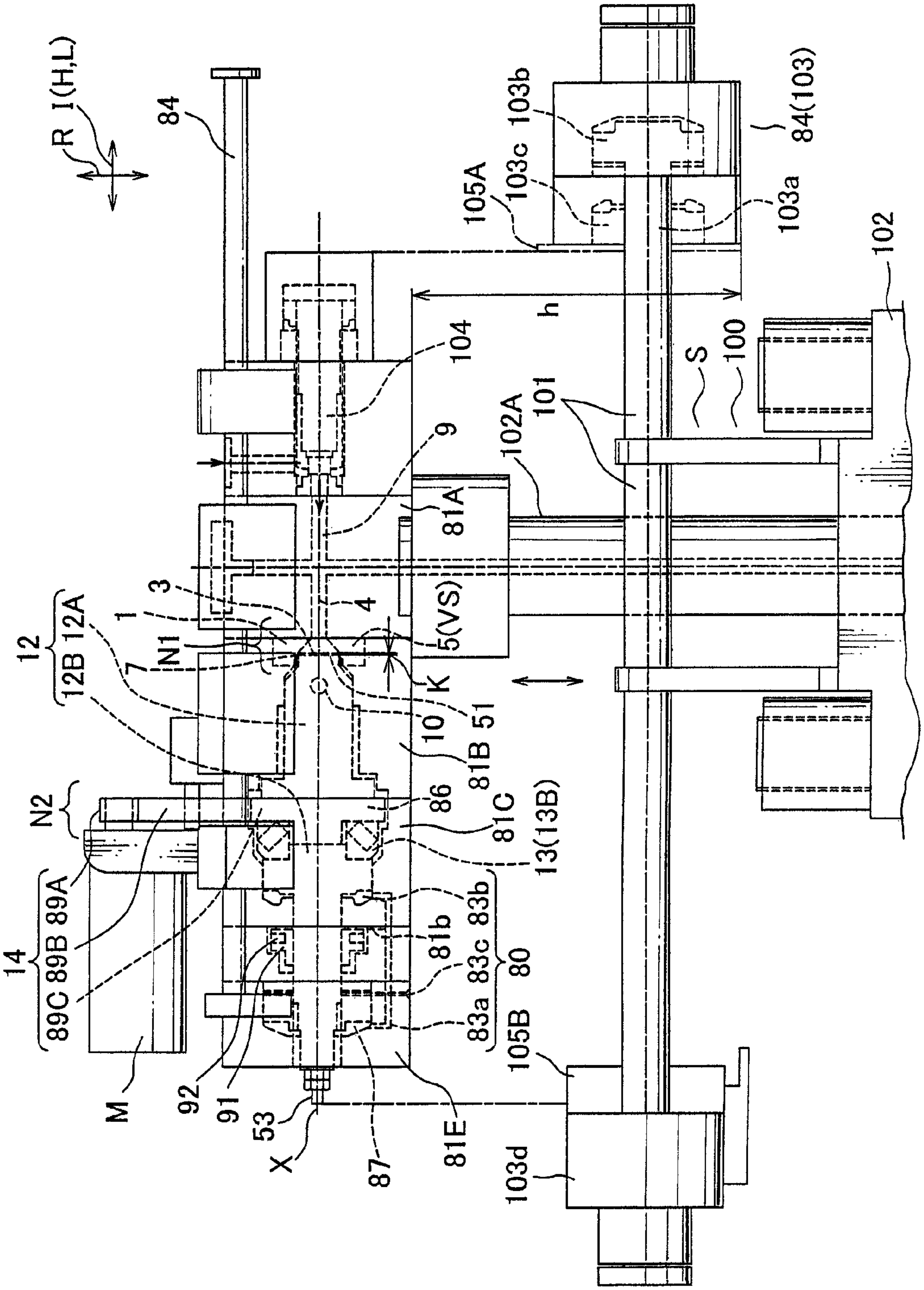
FIG. 16 is a plan view showing an elevated injection valve of the high pressure homogenizer according to the present invention.
Figure 17:
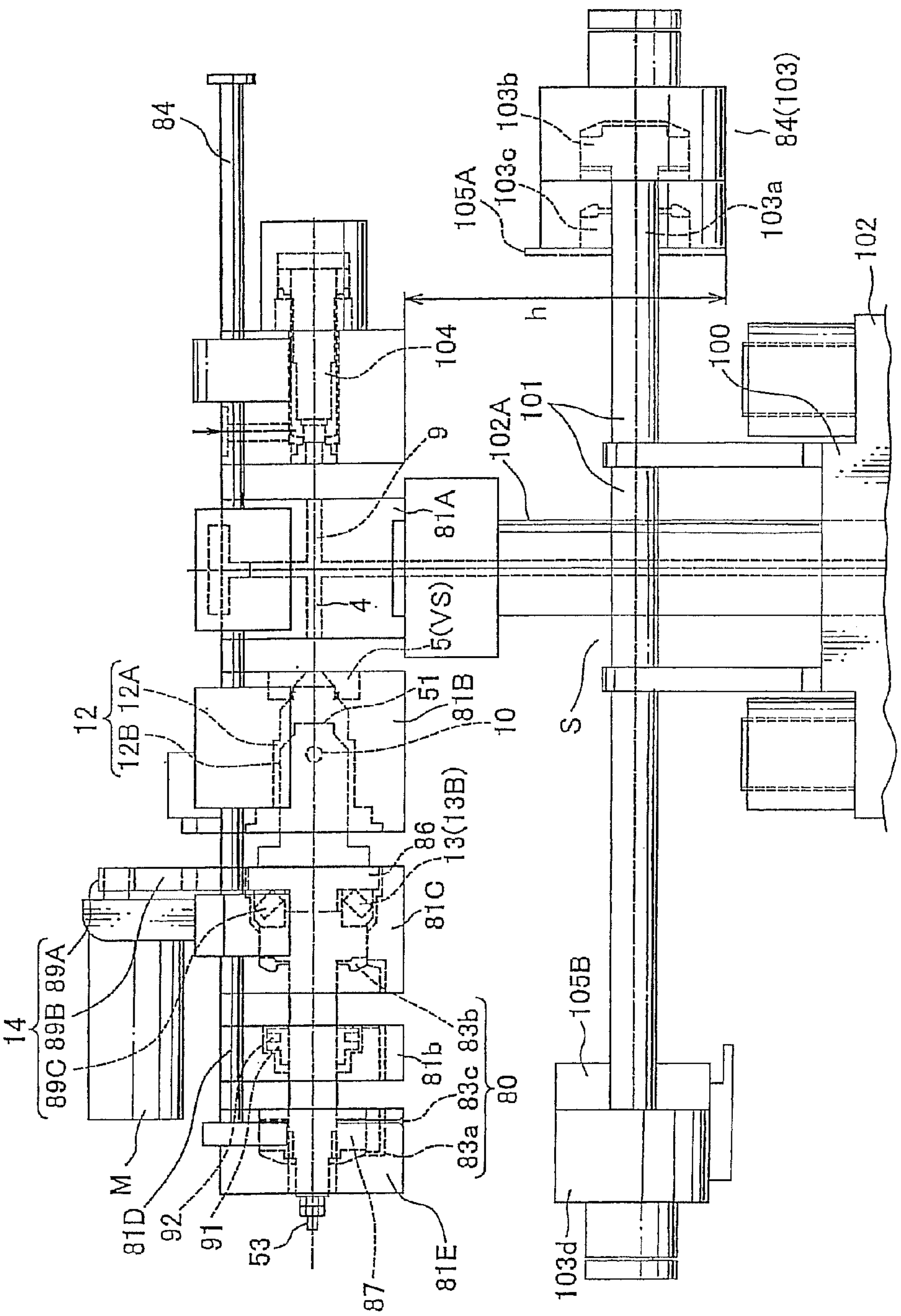
FIG. 17 is a plan view showing the injection valve of the high pressure homogenizer separated laterally.

Further, according to the seventh embodiment, as shown in FIG. 12, the shaft valve 12 as the movable member 6 is moved forward with respect to the valve seat VS as the fixed member 5 when the rear walls of the first spill part 86 and the second spill part 87 receive the pressure such as oil pressure supplied via the forward pressure introducing passages 83*a*, 83*b*. Further, when the front wall of the second spill part 87 receives the pressure supplied via the backward pressure introducing passage 83*c* formed on the cylinder case block 81D, the shaft valve 12 is moved backward with respect to the valve seat VS. Thus, the width of the gap K of the minute orifice 3 is adjusted.

Thus, the cylinder case 11 includes the fixed member 5 including internally the material introducing passage 4, and the shaft valve 12 as the movable member 6 disposed rotatably, swingably, or pulsatingly opposite to the fixed member 5 in an axial direction of the fixed member 5. Further, the orifice 3 having a minute gap K, for example less than 0.01 mm is formed between the end face 5*a* of the fixed member 5 facing an end of the material introducing passage 4 and the end face 6*a* of the movable member 6 disposed at an end of the movable member 6 opposed to the fixed member 5. Therefore, the suspension liquid 2 including the material G is guided into the high pressure homogenization mechanical section 1 via the material introducing port 9, compressed in high pressure by the not-shown booster mechanical section, and discharged swiftly via the orifice 3. Thus, the material G is dispersed due to the large pressure difference, and collided with the tip member 12*c* made of cemented carbide, then collided again with the ring-shaped collision wall 7 formed on the outer periphery of the orifice 3 and on the inner periphery of the cone-shaped small diameter receiving hole 11*a*'. Thus, the material G is effectively segmentalized or homogenized.

Further, the forward pressure introducing passages 83*a*, 83*b* are formed on the interiors of the cylinder block cases 81E, 81C in the cylinder case 11 and the backward pressure introducing passage 83*c* is formed on the interior of the cylinder case block 81E. Therefore, the interior of the cylinder case 11 is highly gas tight. Therefore, the response of moving the shaft valve 12 as the movable member 6 forward and backward or stopping the shaft valve 12 is rapid, and the shaft valve 12 is finely controlled with high precision.

At this time, the movable member 6 is moved forward or backward against the high pressure due to the discharge of the material G via the orifice 3, so that the gap K of the orifice 3 is correctly kept. Therefore, the orifice 3 is not plugged with the material G, and the high pressure homogenizer can be continuously operated. Further, the gap K of the orifice 3 can be finely adjusted corresponding to the hardness or the size of the material G. Therefore, unintentional leak of the material G via the orifice 3 is prevented and the material G is effectively segmentalized or homogenized in high pressure with high precision.

Further, when the not-shown sensor detects that the compression pressure of the material G at the not-shown booster mechanical section is a predetermined value, the motor M as the driving source is driven and rotated according to the detecting signal of the pressure sensor. Therefore, the shaft valve 12 is rotated in a range of 10 to 100 rotations/min via the driving gear 89A, the intermediate gear 89B, and the receiving gear 89C as the rotation transmitting member 14 arranged at the other end thereof without any deviation in both the radial direction R and the axial direction I. Thus, because the shaft valve 12 as the movable member 6 is rotated due to the driving force of the motor M, and stirs and fluidizes the suspension liquid 2, even when the suspension liquid 2 is viscous, the orifice 3 is not plugged with the material G, discharging pressure is kept high, and the material G is effectively segmentalized or homogenized with high precision.

Further, according to the seventh embodiment, the cylinder case 11 is composed of the cylinder case block 81A, the cylinder case block 81B having the inner pressure adjusting valve setting area N1 in which the orifice 3 is formed, the cylinder case block 81C having the power introducing area N2 in which the driving force of the motor M is introduced via the rotation transmitting member 14, the cylinder case blocks 81E, 81C in which the forward pressure introducing passages 83*a*, 83*b* are formed for moving forward the movable member 6 with respect to the valve seat VS as the fixed member 5, and the cylinder case block 81E in which the backward pressure introducing passage 83*c* is formed for moving backward the movable member 6 with respect to the valve seat VS. These cylinder case blocks 81A, 81B, 81C, 81D, 81E are connected by the clipping force of the clipping cylinders 103 in the axial direction I. Therefore, when the suspension liquid 2 is viscous and the orifice 3 is plugged with the material G, the connection of the cylinder case blocks 81A, 81B, 81C, 81D, 81E is released. Then, the cylinder case blocks 81A, 81B, 81C, 81D, 81E are moved upward in the height h with respect to the stopping position S of the attaching base 100 by driving the elevating cylinder 102. Then, the cylinder case blocks 81A, 81B, 81C, 81D, 81E are moved manually along the balanced guiding rods 84 in lateral directions H, L to be separated from each other (see FIG. 17).

At this time, because the cylinder case blocks 81A, 81B, 81C, 81D, 81E are moved along the balanced guiding rods 84 in the axial direction I via the bearings 85, even when the cylinder case blocks 81A, 81B, 81C, 81D, 81E are heavy, only by pressing lightly the cylinder case blocks 81A, 81B, 81C, 81D, 81E, they are moved easily and smoothly. After the cylinder case blocks 81A, 81B, 81C, 81D, 81E are separated from each other, spaces are generated for easily replacing the abraded shaft valve 12, the abraded driving gear 89A, the abraded intermediate gear 89B, or the abraded receiving gear 89C with the new ones. Further, when the orifice 3 is plugged with the material G, it is easy to clean the orifice 3. The height h and gaps between the cylinder case blocks 81A, 81B, 81C, 81D, 81E are so decided as to easily replace the parts and clean the orifice 3.

After replacing the parts or cleaning the orifice 3, the cylinder case blocks 81A, 81B, 81C, 81D, 81E are moved back along the balanced guiding rods 84 in the lateral direction H, L. Then, by driving the elevating cylinder 102 to shrink a cylinder rod 102*a*, the cylinder case blocks 81A, 81B, 81C, 81D, 81E are moved down to the setting position S of the attaching base 100. Then, the clipping cylinders 103 as the connecting members 82 and the stopper 103*d* clip the cylinder case blocks 81A, 81B, 81C, 81D, 81E in the lateral direction H, L (see FIG. 12). Thus, parts of the high pressure homogenizer are easily replaced, and the maintenance of the high pressure homogenizer is easy.

Eighth Embodiment

Figure 18:
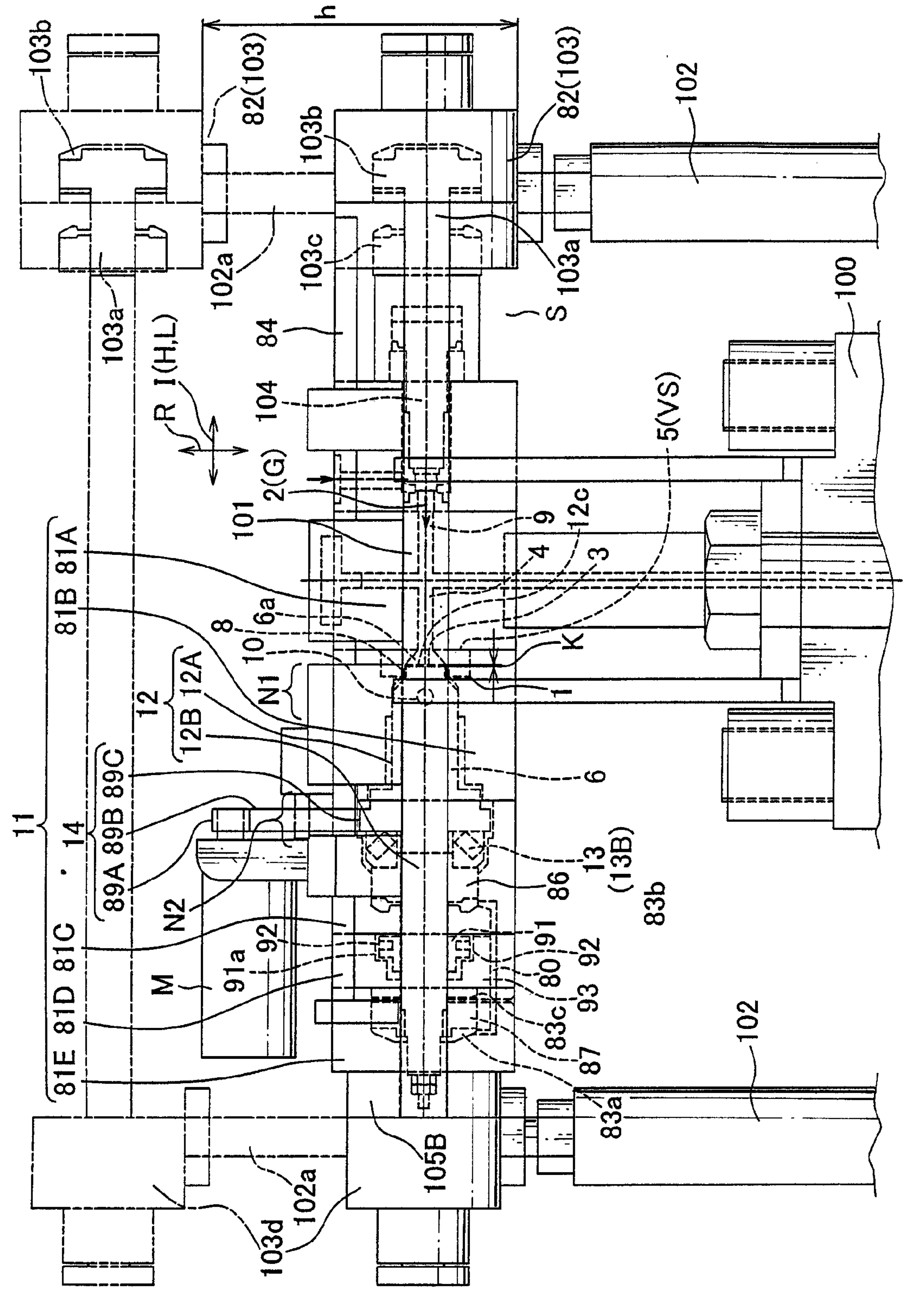
FIG. 18 is a front view showing an eighth embodiment of the injection valve of the high pressure homogenizer according to the present invention.

FIG. 18 shows an eighth embodiment of the injection valve of the high pressure homogenizer according to the present invention. According to the previous seventh embodiment, in the normal time when the material G is segmentalized, dispersed, emulsified, atomized, or cells of the material are disrupted, while the several cylinder case blocks 81A, 81B, 81C, 81D, 81E are movably supported by the guiding rods 84, the several cylinder case blocks 81A, 81B, 81C, 81D, 81E are unmovably connected by the connecting members 82 at a setting position S in the substantially center in a width direction W of supporting rods 101 disposed right and left of an attaching base 100. Further, either one of the cylinder case blocks 81A, 81B, 81C, 81D, 81E or the connecting members 82, in the seventh embodiment the cylinder case blocks 81A, 81B, 81C, 81D, 81E are elevatably supported by an elevating cylinder 102 with respect to the connecting members 82. In the maintenance time when the parts are replaced or the interior of the injection valve is cleaned, either one of the cylinder case blocks 81A, 81B, 81C, 81D, 81E or the connecting members 82, in the seventh embodiment the cylinder case blocks 81A, 81B, 81C, 81D, 81E are moved upward in the movement allowing height h, which allows the guiding rods 84 to move in the lateral direction H, L, with respect to the connecting members 82 by the elevating cylinder 102. According to the eighth embodiment, in contradiction to the seventh embodiment, in the maintenance time when the parts are replaced or the interior of the injection valve is cleaned, the elevating cylinder 102 moves upward or downward the clipping cylinders 103 as the connecting members 82 and the stopper 103*d* in the movement allowing height h to allow the cylinder case blocks 81A, 81B, 81C, 81D, 81E to be moved in the lateral directions H, L. Further, according to the seventh embodiment, the cylinder case blocks 81A, 81B, 81C, 81D, 81E are heavy and difficult to be moved upward or downward. On the other hand, according to the eighth embodiment, the connecting member 82 is light and easy to be moved upward or downward. Therefore, a power output of the elevating cylinder 102 in the eighth embodiment can be smaller than that in the seventh embodiment, and the elevating cylinder 102 in the eighth embodiment can be smaller than that in the seventh embodiment.

Ninth Embodiment

Figure 19:
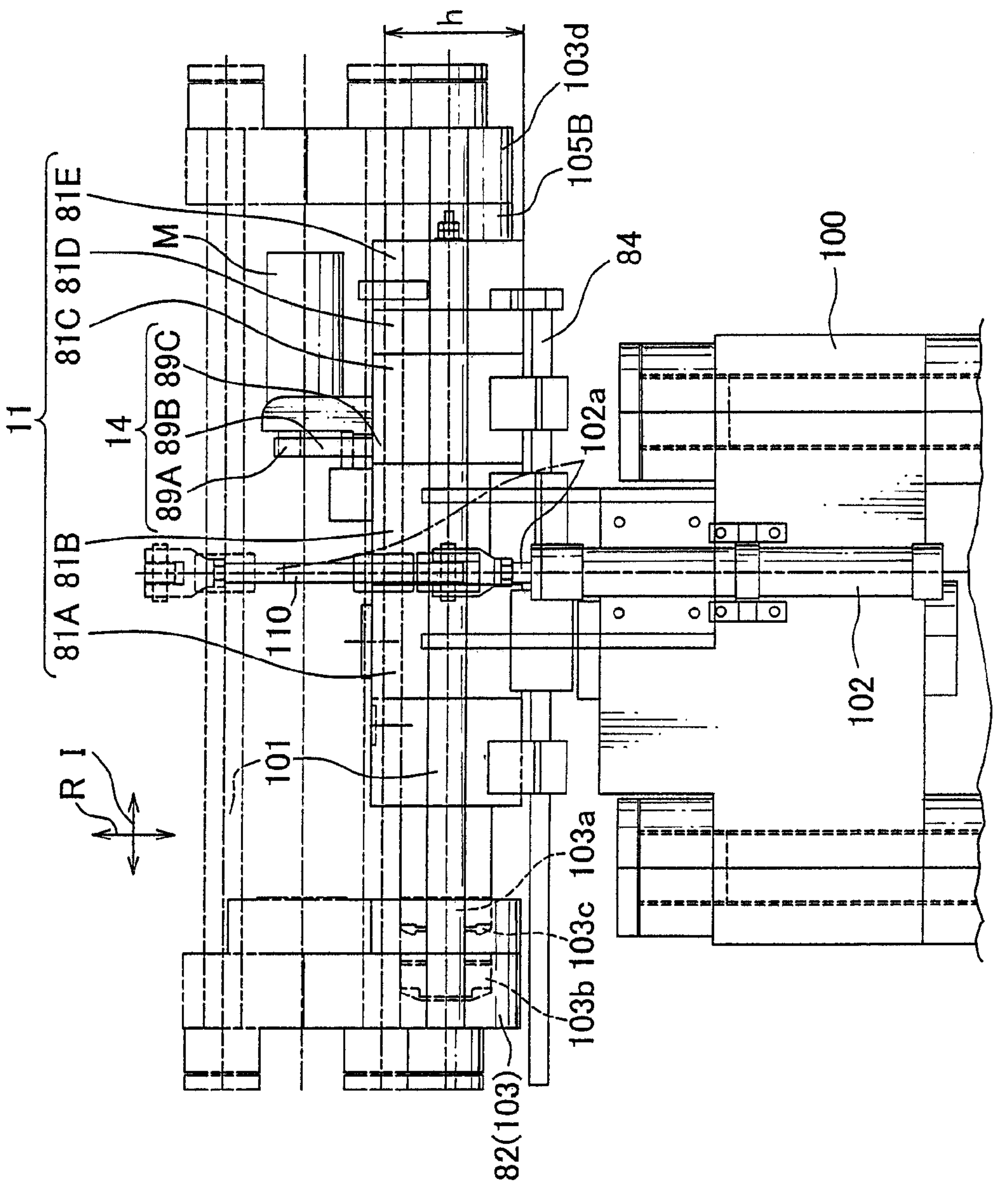
FIG. 19 is a front view showing a ninth embodiment of the injection valve of the high pressure homogenizer according to the present invention.
Figure 20:
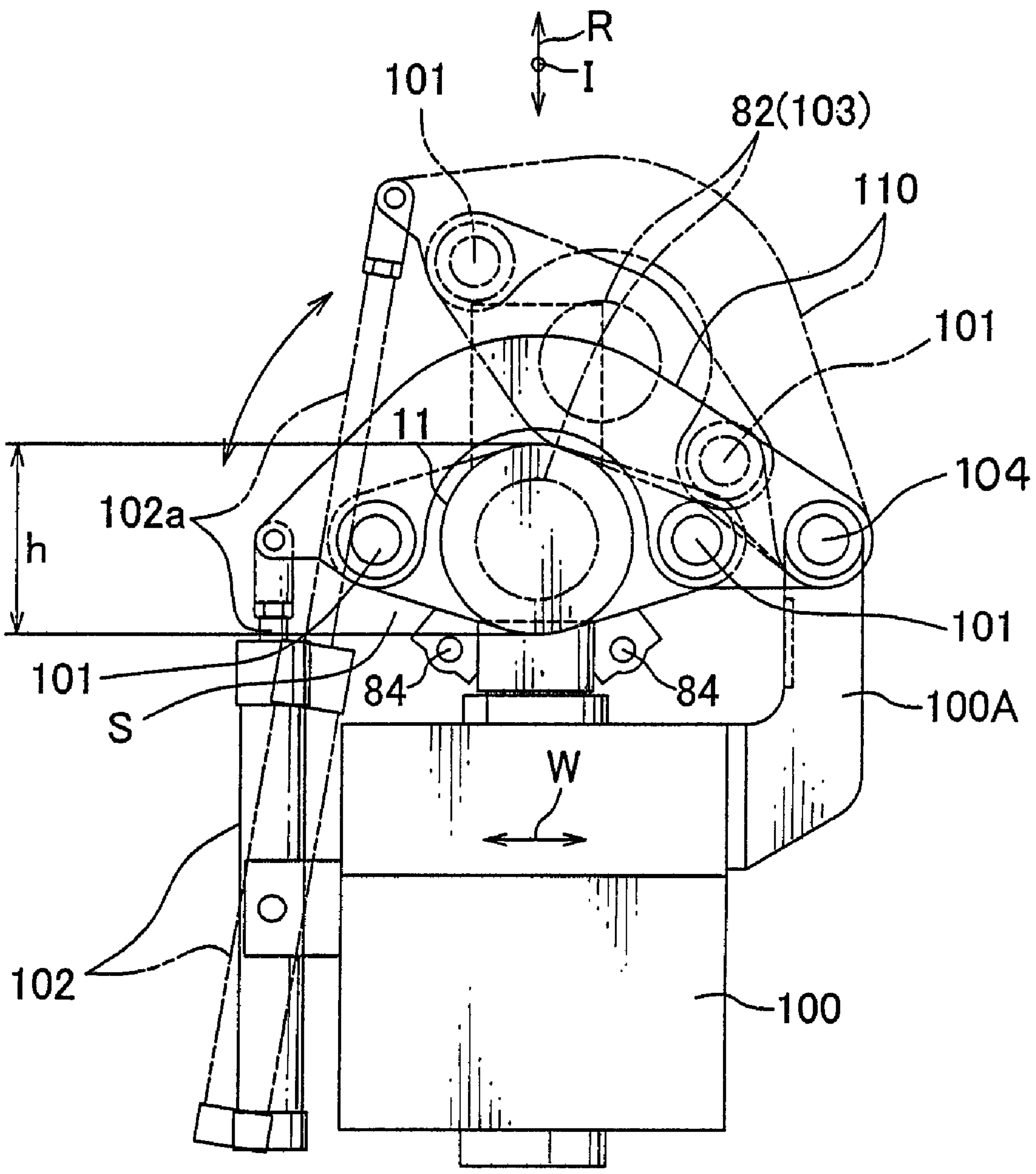
FIG. 20 is a side view of the same.

FIGS. 19 and 20 show a ninth embodiment of the injection valve of the high pressure homogenizer according to the present invention. According to the ninth embodiment, the connecting member 82 separated from the cylinder case blocks 81A, 81B, 81C, 81D, 81E is attached to a cross-link 110 mounted over the cylinder case blocks 81A, 81B, 81C, 81D, 81E in the width direction W via the supporting rods 101. One side of the cross-link 110 in the width direction W is mounted on the attaching base 100 via an arm 100A pivotably around a rotation supporting shaft 104. The other end of the cross-link 110 in the width direction W is coupled to the cylinder rod 102*a* of the elevating cylinder 102. In the maintenance time when the parts are replaced or the interior of the cylinder case 11 is cleaned, by driving the elevating cylinder 102, the connecting member 82 is tilted about the rotation supporting shaft 104 in the movement allowing height h to allow the cylinder case blocks 81A, 81B, 81C, 81D, 81E to be moved in the lateral directions H, L from the setting position S.

When the elevating cylinder 102 is driven, the cross-link 110 over the cylinder case blocks 81A, 81B, 81C, 81D, 81E is rotated about the elevating cylinder 102 in a clockwise direction in FIG. 20 and moved upward. Thus, because the cylinder case blocks 81A, 81B, 81C, 81D, 81E are rotated about the elevating cylinder 102 to move upward, the movement allowing height h to allow the cylinder case blocks 81A, 81B, 81C, 81D, 81E to be moved in the lateral direction H, L with the guide of the guiding rods 84 is effectively secured. Therefore, by removing or connecting the cylinder case 11 with the guide of the guiding rods 84, the parts of the cylinder case 11 can be surely and easily be replaced in a smaller and narrower space. Further, the high pressure homogenizer is also easily disassembled, assembled, and cleaned to form the orifice 3 with the proper gap K.

Further, according to the ninth embodiment, by driving the elevating cylinder 102, the cylinder case blocks 81A, 81B, 81C, 81D, 81E with the cross-link 110 are rotated in the clockwise direction about the elevating cylinder 102 to be moved upward in the movement allowing height h to allow the cylinder case blocks 81A, 81B, 81C, 81D, 81E to be moved in the lateral directions H, L. However, the present invention is not limited to this. The cylinder case blocks 81A, 81B, 81C, 81D, 81E with the cross-link 110 may be rotated in the counterclockwise direction to be moved upward in the movement allowing height h. Further, according to the ninth embodiment, the cross-link 110 is mounted over the cylinder case blocks 81A, 81B, 81C, 81D, 81E. However, the cross-link 110 may be mounted under the cylinder case blocks 81A, 81B, 81C, 81D, 81E. Further, the elevating cylinder 102 may be mounted on upper sides of the cylinder case blocks 81A, 81B, 81C, 81D, 81E.

Further, according to the first, second, third, fourth, fifth, sixth, seventh, eighth, and ninth embodiments, the motor M rotates normally or reversely the shaft valve 12 via the rotation transmitting member 14 to prevent the orifice 3 from being plugged with the material G. However, this is only one example. According to the present invention, the motor may swing or pulsate the shaft valve 12 to prevent the shaft valve 12 from being plugged with the material G.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An injection valve of a high pressure homogenizer, comprising:

a pair of cylinder case blocks releasably connected together;

a fixed member having a material introducing passage therein, formed separately from each cylinder case block and located between and engaging the pair of cylinder case blocks when said pair of cylinder case blocks are connected together; and a movable member disposed rotatably, or slidably opposite to the fixed member in an axial direction of the fixed member, wherein an orifice of the injection valve is made of a fine gap disposed between an end face of the fixed member facing an end of the material introducing passage and an end face of the movable member disposed at an end of the movable member opposed to the fixed member, and wherein the orifice communicates with a material processing passage disposed at a secondary side via a collision wall that is separate from the fixed member, separate from the cylinder case blocks, removably carried by or adjacent to the fixed member and located at an outer periphery of the orifice, and wherein said pair of cylinder case blocks can be separated to provide ready access to the fixed member, collision wall and movable member to facilitate repair or replacement of one or more of these components.

2. The injection valve as claimed in claim 1, further comprising:

a pressure sensor for detecting that a compression pressure of a booster mechanical section is a predetermined pressure; and a motor as a driving source to rotate the movable member normally or reversely, the movable member according to a detection signal detected by the pressure sensor.

3. The injection valve as claimed in claim 1, wherein the fixed member and the movable member are received in a cylinder case in which a material introducing port communicating with the material introducing passage is disposed at one side thereof, and a material exhausting port communicating with the orifice is disposed at the other side thereof.

4. The injection valve as claimed in claim 1, wherein the fixed member is a valve seat received in the cylinder case.

5. The injection valve as claimed in claim 1, wherein the movable member is a shaft valve supported rotatably, or slidably in the cylinder case via a roller bearing member, and disposed rotatably, via a rotation transmitting member arranged at the other end thereof owing to driving force of a motor.

6. The injection valve as claimed in claim 5, wherein the motor is rotated in a range of 10 rotations/min to 100 rotations/min in order to torque the shaft valve as the movable member.

7. The injection valve as claimed in claim 5, wherein the roller bearing member consists of any one of a ball bearing, a thrust bearing, a roller bearing, or a gunmetal bearing having a porous part including oil on its surface, or a combination of the same.

8. The injection valve as claimed in claim 1, wherein a tip of the movable member is inserted loosely into a small diameter receiving hole of the fixed member.

9. The injection valve as claimed in claim 1, wherein an outer peripheral wall with a small slope angle with respect to an axial line is formed on a tip part of the movable member, and the tip part is loosely inserted into a small diameter receiving hole of the fixed member which includes an inner peripheral wall that is sloped.

10. The injection valve as claimed in claim 9, wherein the slope angle of the outer peripheral wall is from one to twenty degrees with respect to the axial line.

11. The injection valve as claimed in claim 1, wherein the orifice is defined by a gap the width of which is adjusted by moving forward or backward slightly the movable member with respect to the fixed member owing to pressing force of a cylinder disposed on an extension from the other end of the shaft valve in an axial direction of the shaft valve.

12. The injection valve as claimed in claim 1, wherein the movable member includes a tip made of cemented carbide, and detachably attached to the movable member by screwing a tip of a mounting bolt into the movable member in a direction of an internal axis of the movable member.

13. The injection valve as claimed in claim 1, wherein a material introducing port communicating with the material introducing passage is disposed at one side of the cylinder case, the material exhausting port is disposed at a rear of the orifice, a direction switching passage for adjusting the width of a gap of the orifice by moving forward or backward the movable member with respect to the valve seat is formed in an interior of the cylinder case, the cylinder case is divided into several cylinder case blocks in the axial direction, and the cylinder case blocks are connected to each other in the axial direction via connecting members.

14. The injection valve as claimed in claim 13, wherein the cylinder case is configured by at least connecting in the axial direction:

a cylinder case block having an area for setting an inner pressure adjusting valve in which the orifice is formed;

another cylinder case block having an area for introducing motivity where the driving force of the motor is introduced via rotation transmitting parts; and another cylinder blocks having the direction switching passage in which a forward pressure introducing passage for moving the movable member toward the valve seat as the fixed member by applying pressure, and/or a backward pressure introducing passage for moving the movable member away from the valve seat by applying pressure are formed.

15. The injection valve as claimed in claim 14, wherein the rotation transmitting parts are gears including a driving gear mounted on a motor shaft, or composed of a driving pulley mounted on the motor shaft, and a passive pulley formed on an outer periphery of the movable member, and a power transmitting belt wounded around the driving pulley and the passive pulley.

16. The injection valve as claimed in claim 13, wherein a plurality of guiding rods projecting from one side or both sides of one of the cylinder case blocks movably penetrates the other cylinder case blocks via bearings in the axial direction, and after releasing the connecting members, the other cylinder case blocks are guided by the guiding rods to be separated from each other.

17. The injection valve as claimed in claim 13, wherein the connecting members are a plurality of bolts to be screwed into and separably integrated with the cylinder case blocks.

18. The injection valve as claimed in claim 1, wherein the orifice has a gap less than 0.01 mm.

19. The injection valve as claimed in claim 1, wherein an inner pressure of the orifice is adjusted to high pressure.

20. An injection valve of a high pressure homogenizer, comprising:

a fixed member having a material introducing passage therein; and a movable member disposed rotatably, or slidably opposite to the fixed member in an axial direction of the fixed member, wherein an orifice of the injection valve is made of a fine gap disposed between an end face of the fixed member facing an end of the material introducing passage and an end face of the movable member disposed at an end of the movable member opposed to the fixed member, wherein the orifice communicates with a material processing passage disposed at a secondary side via a collision wall formed on an outer periphery of the orifice;

wherein a material introducing port communicating with the material introducing passage is disposed at one side of the cylinder case, the material exhausting port is disposed at a rear of the orifice, a direction switching passage for adjusting the width of a gap of the orifice by moving forward or backward the movable member with respect to the valve seat is formed in an interior of the cylinder case, the cylinder case is divided into several cylinder case blocks in the axial direction, and the cylinder case blocks are connected to each other in the axial direction via connecting members;

wherein a plurality of guiding rods projecting from one side or both sides of one of the cylinder case blocks movably penetrates the other cylinder case blocks via bearings in the axial direction, and after releasing the connecting members, the other cylinder case blocks are guided by the guiding rods to be separated from each other;

wherein at a normal time when the material is dispersed, emulsified, atomized, or cells of the material are disrupted, several cylinder case blocks are connected with the connecting members and disposed immovably at a setting position in a substantially center of supporting rods in a width direction thereof while the cylinder case blocks are supported movably by the guiding rods, said supporting rods arranged right and left of an attaching base, and wherein either of the cylinder case blocks or the connecting members is elevatably supported against the others by an elevating cylinder, and wherein at a time when parts are exchanged, or an interior of the injection valve is cleaned, either of the cylinder case blocks or the connecting members are elevatably raised to a movement permissible height of the cylinder case blocks against the others.

21. The injection valve as claimed in claim 20, wherein the connecting members are attached to a bridged link linked to upper or lower part of the cylinder case blocks in the width direction thereof via the supporting rods separated from the cylinder case blocks, wherein one side in the width direction of the bridged link is pivotably mounted on the attaching base via a spindle, and the other side in the width direction of the bridged link is coupled to a cylinder rod of the elevating cylinder, and wherein at the time when parts are exchanged, or an interior of the injection valve is cleaned, the connecting members are inclinably mounted about the spindle at a movement permissible height to allow the cylinder case blocks positioned at the setting position to move horizontally from the setting position owing to driving of the elevating cylinder.

22. The injection valve as claimed in claim 20, wherein the connecting members are clamping cylinders to couple the cylinder case blocks moved down from a movement permissible position to the setting position onto the attaching base, or to clamp the cylinder case block at a dropping position where the connecting members are dropped from the movement permissible position to the setting position against the fixed cylinder case blocks.

23. An injection valve of a high pressure homogenizer, comprising:

a fixed member having a material introducing passage therein; and a movable member disposed rotatably, or slidably opposite to the fixed member in an axial direction of the fixed member, wherein an orifice of the injection valve is made of a fine gap disposed between an end face of the fixed member facing an end of the material introducing passage and an end face of the movable member disposed at an end of the movable member opposed to the fixed member, wherein the orifice communicates with a material processing passage disposed at a secondary side via a collision wall formed on an outer periphery of the orifice;

wherein a material introducing port communicating with the material introducing passage is disposed at one side of the cylinder case, the material exhausting port is disposed at a rear of the orifice, a direction switching passage for adjusting the width of a gap of the orifice by moving forward or backward the movable member with respect to the valve seat is formed in an interior of the cylinder case, the cylinder case is divided into several cylinder case blocks in the axial direction, and the cylinder case blocks are connected to each other in the axial direction via connecting members;

wherein the cylinder case is configured by at least connecting in the axial direction:

a cylinder case block having an area for setting an inner pressure adjusting valve in which the orifice is formed;

another cylinder case block having an area for introducing motivity where the driving force of the motor is introduced via rotation transmitting parts; and another cylinder block having the direction switching passage in which a forward pressure introducing passage for moving the movable member toward the valve seat as the fixed member by applying pressure, and/or a backward pressure introducing passage for moving the movable member away from the valve seat by applying pressure are formed;

wherein the movable member has a first spill part formed on an outer periphery in a substantially center of the movable member to receive pressure from the forward pressure introducing passage formed on the cylinder case, and a second spill part formed on the outer periphery at a back side of the movable member to receive both pressure from the forward pressure introducing passage and pressure from the backward pressure introducing passage.

24. An injection valve unit of a high pressure homogenizer comprising:

a fixed member having a material introducing passage in a cylinder case; and a movable member disposed normally and reversely rotatably, or slidably opposite to the fixed member in an axial direction of the fixed member, wherein an orifice of the injection valve is made of a fine gap disposed between an end face of the fixed member facing an end of the material introducing passage and an end face of the movable member disposed at an end of the movable member opposed to the fixed member, and wherein the orifice communicates with a material processing passage disposed at a secondary side via a collision wall that is separate from the fixed member, removably carried by or adjacent to the fixed member and located at an outer periphery;

a cylinder case in which the fixed member and collision wall are carried and which is divided into several cylinder case blocks in the axial direction, and the cylinder case blocks are connected to each other in the axial direction via connecting members;

wherein a plurality of guiding rods projecting from one side or both sides of one of the cylinder case blocks movably penetrates the other cylinder case blocks, and after releasing the connecting members, the other cylinder case blocks are guided by the guiding rods to be separated from each other;

wherein either of the cylinder case blocks or the connecting members is elevatably supported against the others by an elevating cylinder, and wherein at a time when parts are exchanged, or an interior of the injection valve is cleaned, either of the cylinder case blocks or the connecting members are elevatably raised to a movement permissible height of the cylinder case blocks against the others.

25. The injection valve unit claimed in claim 24, further comprising:

a tip member made of cemented carbide, and detachably attached to the movable member by screwing a tip of a mounting bolt into the tip member, said mounting bolt being inserted into the movable member in a direction of an internal axis of the movable member.

26. The injection valve as claimed in claim 24, wherein the movable member is a shaft valve supported in the cylinder case via a roller bearing member, and disposed normally and reversely rotatably, or slidably via a rotation transmitting member arranged at the other end thereof owing to driving force of the motor.

27. The injection valve as claimed in claim 24, wherein an outer peripheral wall with a small slope angle with respect to an axial line is formed on a tip part or the tip member of the movable member, and the tip part or the tip member is loosely inserted into the small diameter receiving hole of the fixed member, of which inner peripheral wall is sloped.

28. The injection valve as claimed in claim 24, wherein the slope angle of the outer peripheral wall is from one to twenty degrees with respect to the axial line.

29. The injection valve as claimed in claim 24, wherein the cylinder case is divided into several cylinder case blocks in the axial direction, and the cylinder case blocks are connected to each other in the axial direction via connecting members, wherein a plurality of guiding rods projecting from one side or both sides of one of the cylinder case blocks movably penetrates the other cylinder case blocks via bearings in the axial direction, and after releasing the connections with the connecting members, the other cylinder case blocks are guided by the guiding rods to be separated from each other.

30. The injection valve as claimed in claim 29, wherein the connecting members are a plurality of bolts to be screwed into and separably integrated with the cylinder case blocks.

31. An injection valve unit of a high pressure homogenizer comprising:

a fixed member having a material introducing passage in a cylinder case; and a movable member disposed normally and reversely rotatably, or slidably opposite to the fixed member in an axial direction of the fixed member, wherein an orifice of the injection valve is made of a fine gap disposed between an end face of the fixed member facing an end of the material introducing passage and an end face of the movable member disposed at an end of the movable member opposed to the fixed member, and wherein the orifice communicates with a material processing passage disposed at a secondary side via a collision wall formed at an outer periphery;

wherein the cylinder case is divided into several cylinder case blocks in the axial direction, and the cylinder case blocks are connected to each other in the axial direction via connecting members, wherein a plurality of guiding rods projecting from one side or both sides of one of the cylinder case blocks movably penetrates the other cylinder case blocks via bearings in the axial direction, and after releasing the connections with the connecting members, the other cylinder case blocks are guided by the guiding rods to be separated from each other; and wherein the connecting members are clamping cylinders to couple the cylinder case blocks at a dropping position where the several cylinder case blocks are moved downward to a base.

32. A high pressure homogenizer, comprising:

a plurality of cylinder case blocks releasably connected together;

a guiding rod along which at least some of the cylinder case blocks may be moved to facilitate separating and joining together the cylinder case blocks;

a fixed member having a material introducing passage therein, formed separately from each cylinder case block and located between and engaging a pair of cylinder case blocks when said pair of cylinder case blocks are connected together; and a movable member disposed opposite to the fixed member in an axial direction of the fixed member, an orifice defined between an end face of the fixed member facing an end of the material introducing passage and an end face of the movable member disposed at an end of the movable member opposed to the fixed member;

a collision wall formed separately from the cylinder case blocks, formed separately from the fixed member and radially surrounding the orifice so that material flowing through the material introducing passage is directed against the end face of the movable member, through the orifice and then against the collision wall before being routed to a material processing passage disposed downstream of the collision wall and wherein said pair of cylinder case blocks can be separated and moved along said guiding rod to provide ready access to the fixed member, collision wall and movable member to facilitate repair or replacement of one or more of these components.

* * * * *